US012222245B2

(12) United States Patent
Ishihara

(10) Patent No.: US 12,222,245 B2
(45) Date of Patent: Feb. 11, 2025

(54) COLORIMETRY SYSTEM, TERMINAL DEVICE, PROCESSING METHOD, AND STORAGE MEDIUM

(71) Applicant: SEIKO EPSON CORPORATION, Tokyo (JP)

(72) Inventor: Masami Ishihara, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 181 days.

(21) Appl. No.: 18/049,659

(22) Filed: Oct. 26, 2022

(65) Prior Publication Data

US 2023/0140709 A1    May 4, 2023

(30) Foreign Application Priority Data

Oct. 29, 2021    (JP) .................................. 2021-177437

(51) Int. Cl.
*G01J 3/46* (2006.01)
*G01J 3/02* (2006.01)

(52) U.S. Cl.
CPC ............. *G01J 3/463* (2013.01); *G01J 3/0264* (2013.01)

(58) Field of Classification Search
CPC .. G01J 3/463; G01J 3/0264; G01J 3/52; G01J 3/0272; G01J 3/46
USPC ........................................................ 356/402
See application file for complete search history.

(56) References Cited

FOREIGN PATENT DOCUMENTS

| JP | 2005-061926 A | | 3/2005 | |
|---|---|---|---|---|
| JP | 2005341035 A | * | 12/2005 | ............. G06K 15/02 |
| JP | 2011-141253 A | | 7/2011 | |

* cited by examiner

*Primary Examiner* — Md M Rahman
(74) *Attorney, Agent, or Firm* — WORKMAN NYDEGGER

(57) ABSTRACT

A colorimetry system determines whether colors of a row on which colorimetry is performed correspond to colors of a row expected for colorimetry and, if the colors of the row on which colorimetry is performed correspond to the colors of the row expected for colorimetry, performs a process of storing data on the colors of the row on which colorimetry is performed. However, if the colors of the row on which colorimetry is performed do not correspond to the colors of the row expected for colorimetry, the colorimetry system performs a display process of asking the user whether to store data on the colors obtained by colorimetry.

8 Claims, 23 Drawing Sheets

FIG. 5

| COLORIMETRY ROW | | FIRST ROW | SECOND ROW | THIRD ROW |
|---|---|---|---|---|
| COLORIMETRIC RESULT ($\Delta E$) | A | 0.3 | 80.5 | 120.8 |
| | B | 0.5 | 93.5 | 0.5 |
| | C | 0.3 | 102.5 | 107.7 |
| | D | 0.3 | 120.9 | 0.7 |
| | E | 0.2 | 99.7 | 0.7 |
| | F | 0.4 | 93.6 | 98.9 |
| | G | 0.1 | 104.6 | 0.6 |
| | H | 0.3 | 96.7 | 94.1 |
| Ave $\Delta E$ | | 0.3 | 99 | 53 |

(REFERENCE COLORS: FIRST ROW)

FIG. 6
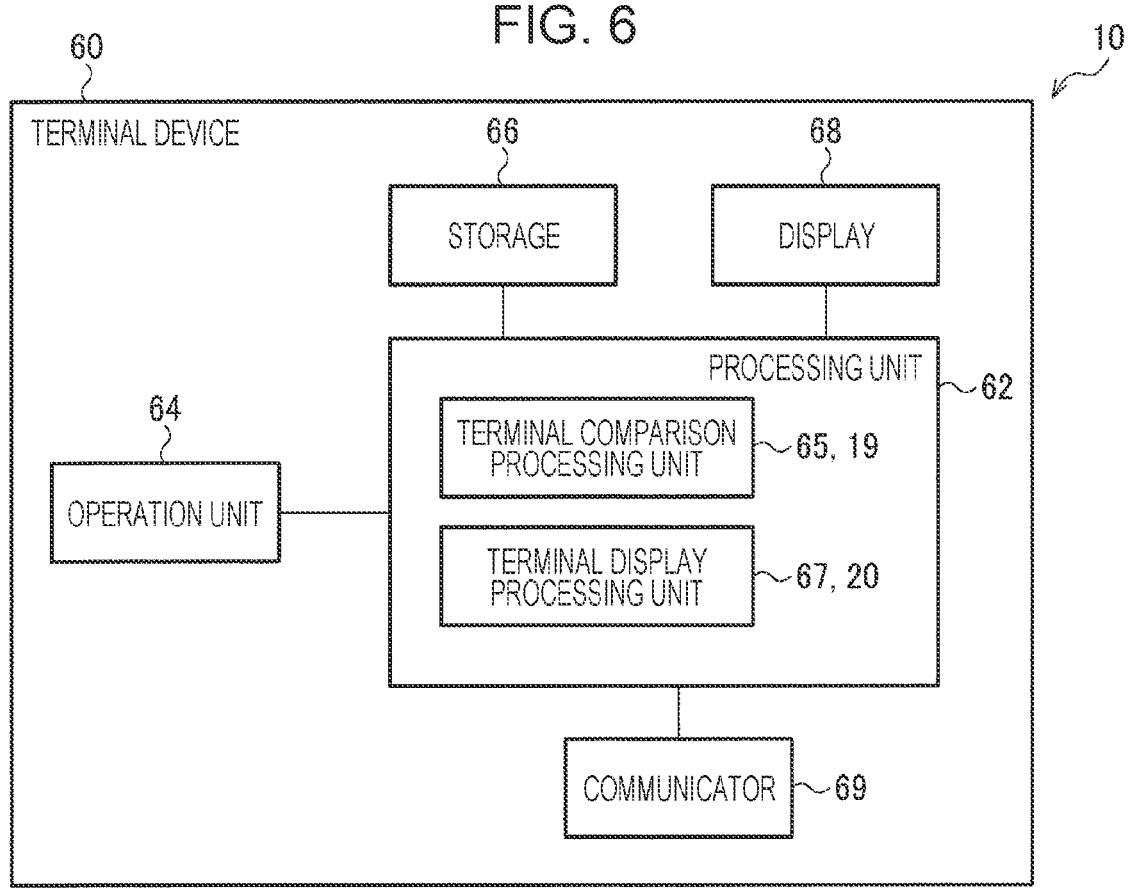
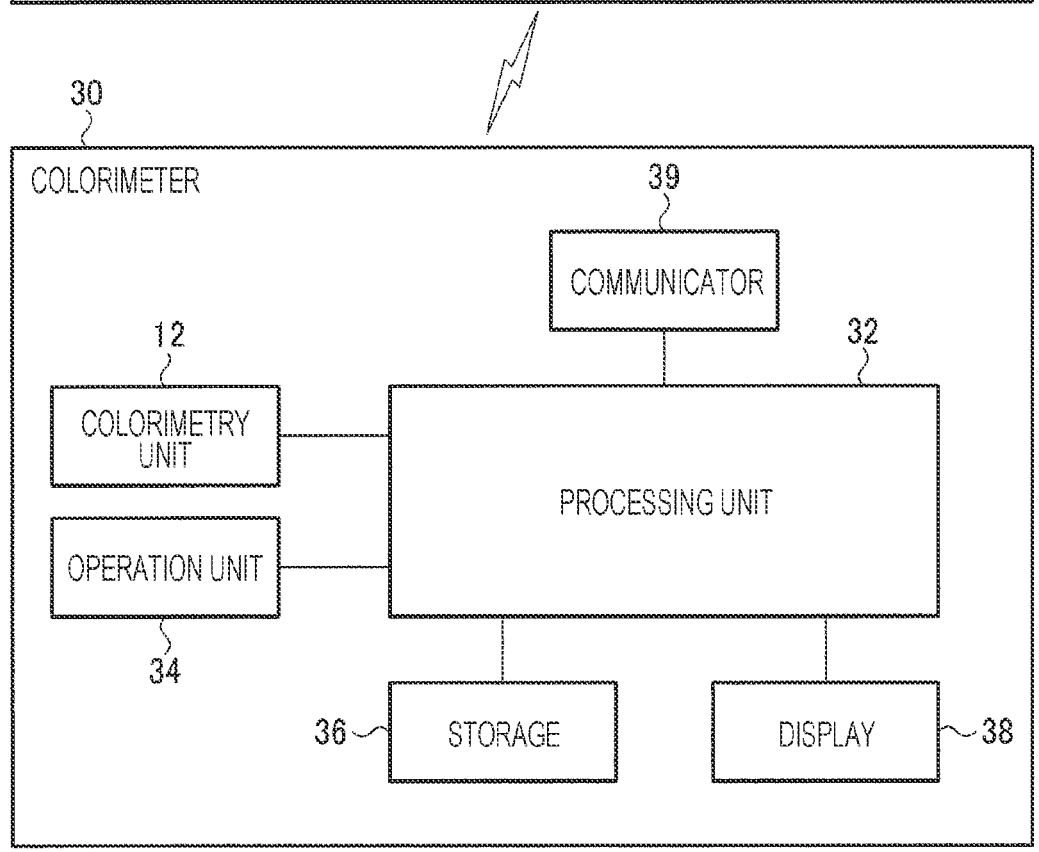

COLORIMETRY SYSTEM, TERMINAL DEVICE, PROCESSING METHOD, AND STORAGE MEDIUM

The present application is based on, and claims priority from JP Application Serial Number 2021-177437, filed Oct. 29, 2021, the disclosure of which is hereby incorporated by reference herein in its entirety.

BACKGROUND

1. Technical Field

The present disclosure relates to a colorimetry system, a terminal device, a processing method, and a storage medium.

2. Related Art

A colorimeter that is used to perform colorimetry on color patches, for example, for a color test pattern of a printing device has been known. JP-A-2005-061926 discloses techniques in which the user performs colorimetry on a desirable line in color patches, the determination is made whether the number of pieces of colorimetric data matches the number of color patches, and, if the determination result is no, the user is notified that the colorimetric data is not proper.

However, in the techniques described in the above document, when the user does not perform colorimetry on a correct color patch line, the data obtained by colorimetry is discarded and the user only performs colorimetry over again. Techniques of asking the user whether to store data obtained by colorimetry performed accidentally, for example, have not been proposed.

SUMMARY

An aspect of the present disclosure relates to a colorimetry system including a comparison processing unit that performs a comparison process for the color values of colors obtained by colorimetry performed by a colorimetry unit that performs colorimetry, and a display processing unit that performs a process of displaying a comparison processing result obtained by the comparison processing unit. The comparison processing unit determines whether the colors of a row on which colorimetry is performed correspond to the colors of a row expected for colorimetry. If the colors of the row on which colorimetry is performed correspond to the colors of the row expected for colorimetry, the comparison processing unit performs a process of storing data on the colors of the row on which colorimetry is performed. If the colors of the row on which colorimetry is performed do not correspond to the colors of the row expected for colorimetry, the display processing unit performs a display process of asking the user whether to store the data on the colors obtained by colorimetry.

In addition, an aspect of the present disclosure relates to a terminal device including a terminal comparison processing unit that performs a comparison process for the color values of colors obtained by colorimetry performed by a colorimeter that performs colorimetry, and a terminal display processing unit that performs a process of displaying a comparison processing result obtained by the terminal comparison processing unit. The terminal comparison processing unit determines whether the colors of a row on which colorimetry is performed correspond to the colors of a row expected for colorimetry. If the colors of the row on which colorimetry is performed correspond to the colors of the row expected for colorimetry, the terminal comparison processing unit performs a process of storing data on the colors of the row on which colorimetry is performed. If the colors of the row on which colorimetry is performed do not correspond to the colors of the row expected for colorimetry, the terminal display processing unit performs a display process of asking the user whether to store the data on the colors obtained by colorimetry.

In addition, an aspect of the present disclosure relates to a processing method of performing a comparison process of performing comparison for the color values of colors obtained by colorimetry performed by a colorimetry unit that performs colorimetry, and a display process of displaying a comparison processing result obtained by the comparison process, a process of determining whether the colors of a row on which colorimetry is performed correspond to the colors of a row expected for colorimetry, a process of, if the colors of the row on which colorimetry is performed correspond to the colors of the row expected for colorimetry, storing data on the colors of the row on which colorimetry is performed, and a display process of, if the colors of the row on which colorimetry is performed do not correspond to the colors of the row expected for colorimetry, asking the user whether to store the data on the colors obtained by colorimetry.

In addition, an aspect of the present disclosure relates to a program that causes a computer to function as a comparison processing unit that performs a comparison process for the color values of colors obtained by colorimetry performed by a colorimetry unit that performs colorimetry, and a display processing unit that performs a process of displaying a comparison processing result obtained by the comparison processing unit. The comparison processing unit determines whether the colors of a row on which colorimetry is performed correspond to the colors of a row expected for colorimetry. If the colors of the row on which colorimetry is performed correspond to the colors of the row expected for colorimetry, the comparison processing unit performs a process of storing data on the colors of the row on which colorimetry is performed. If the colors of the row on which colorimetry is performed do not correspond to the colors of the row expected for colorimetry, the display processing unit performs a display process of asking the user whether to store the data on the colors obtained by colorimetry.

BRIEF DESCRIPTION OF THE DRAWINGS

FIG. 5 is a table illustrating a specific example of colorimetric results.

FIG. 6 is a block diagram illustrating an exemplary configuration of a terminal device and a colorimeter constituting a colorimetry system.

DESCRIPTION OF EXEMPLARY EMBODIMENTS

The present embodiment will be described below. The present embodiment given below does not unreasonably limit the content of the present disclosure described in the appended claims. In addition, all of the configurations described in the present embodiment are not necessarily essential to the present disclosure.

Figure 1:
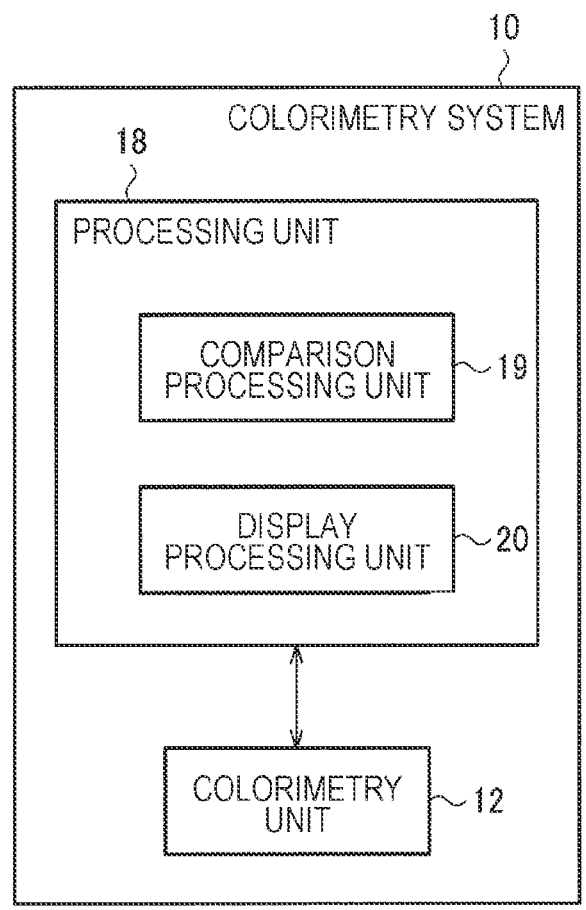
FIG. 1 is a block diagram illustrating an exemplary configuration of a colorimetry system.

FIG. 1 is a block diagram illustrating an exemplary configuration of a colorimetry system 10 according to the present embodiment. The colorimetry system 10 according to the present embodiment includes a colorimetry unit 12 and a processing unit 18. The processing unit 18 includes a comparison processing unit 19 and a display processing unit 20. Although the colorimetry system 10 may be implemented, for example, by a terminal device 60 described below, the colorimetry system 10 may also be implemented by the terminal device 60 and the colorimeter 30 described below. In addition, the colorimetry system 10 may be implemented in various forms, in which, for example, the colorimeter 30 is communicatively coupled to a cloud computing environment.

The colorimetry unit 12 performs colorimetry. Specifically, the colorimetry unit 12 performs colorimetry on a target color, for example, printed on a printing medium and outputs a color value as a colorimetric result. The colorimetry unit 12 may be implemented by a colorimetric sensor or the like. As the colorimetric sensor, for example, a spectroscopic sensor may be used. For example, as the colorimetric sensor, a spectroscopic sensor produced by using microelectro-mechanical systems (MEMS) or the like, which enables simultaneous production in a wafer-level process, may be used. The spectroscopic sensor is a sensor that measures, for example, a reflection spectrum. Specifically, the spectroscopic sensor may include, for example, a light source of a light-emitting diode (LED) or the like, an optical filter that receives light emitted from the light source and reflected on a measurement surface and selects and switches the wavelength, a light-receiving device that measures the amount of reflected light passing through the optical filter, and so on. The optical filter may use, for example, an etalon, which is a wavelength filter utilizing multiple interferences of two facing reflecting surfaces. Using a spectroscopic sensor, measurement of a reflection spectrum in which the amount of reflected light is measured at each wavelength of the reflected light is performed, thus implementing colorimetry on a target color. The colorimetric sensor by which the colorimetry unit 12 is implemented is not limited to such a spectroscopic sensor and may be implemented, for example, by an image sensor or the like. In addition, the colorimetry unit 12 that not only performs colorimetry on a reflected light but also performs colorimetry on a transmitted light may be employed.

The processing unit 18 controls the components of the colorimetry system 10. The processing unit 18 may be implemented by a processor of a processing unit 62 of the terminal device 60 described below but may also be implemented by a processor or the like of the processing unit 32 of the colorimeter 30 described below or may also be implemented by both the processors, which is described in more detail below. The processing unit 18 performs processes according to the present embodiment based on a program according to the present embodiment. This program is a program for causing a computer to function as each component according to the present embodiment. The computer is a device including, for example, an operation unit, a processing unit, a storage, and an output unit. For example, the program according to the present embodiment is a program for causing a computer to function as the comparison processing unit 19 and the display processing unit 20. This program is stored in, for example, an information storage medium. That is, the colorimetry system 10 according to the present embodiment is able to perform processes according to the present embodiment based on a program stored in the information storage medium. The information storage medium, which is a computer-readable medium, stores programs, data, and so on, and the functions of the information storage medium may be implemented by an optical disk, a hard disk device (HDD), a semiconductor memory, or the like.

The comparison processing unit 19 performs a comparison process between the received color value and the color value of a reference color. For example, for each of the first to Nth colors (N being an integer greater than or equal to two), the comparison processing unit 19 compares the color obtained by colorimetry with the color of a comparison target and determines whether the colors match. Matching between the color obtained by colorimetry and the color of the comparison target means that both the colors satisfy the permissible conditions of matching between the colors. The permissible conditions may be set in various ways. For example, when a color difference ΔE between the color obtained by colorimetry and the color of the comparison target is less than a given value, the comparison processing unit 19 determines that the color obtained by colorimetry matches the color of the comparison target. The permissible conditions may be other conditions for the color difference ΔE or conditions for ambient light sources and may be conditions for each color component or conditions for the reflection spectrum. In addition, a combination of these conditions may be permissible conditions. The comparison process may be performed in a spot colorimetry mode in which colorimetry is performed one by one on a per-spot basis. In the case where a plurality of colors to be targeted for colorimetry are arranged in lines, the comparison process may be performed in a line colorimetry mode in which colorimetry is performed collectively on a plurality of colors on a per-line basis. Hereafter, colorimetry in the line colorimetry mode may be referred to simply as line colorimetry. In addition, the line colorimetry may be referred to as scan colorimetry. In addition, to perform line colorimetry, N colors are to be used as a comparison target. A set of colors to be used, consisting of N colors, is referred to herein as a color group.

In addition, the comparison processing unit 19 decides whether a line colorimetry error has occurred in a row on which colorimetry is being performed. The line colorimetry error is an error indicating that a line actually used by a user for line colorimetry does not match a line that is an original target for colorimetry. For example, assume that the user has used a desired line in a colorimetry object for colorimetry performed as line colorimetry. By using a colorimetric result obtained by performing colorimetry for the first to Nth colors included in the line, the comparison processing unit 19 determines, according to predetermined decision criteria described below, whether a line determined as the original target for colorimetry by the user matches the line actually used by the user for colorimetry.

The display processing unit 20 performs a display process in accordance with a process performed by the processing unit 18 including the comparison processing unit 19, based on a program according to the present embodiment. For example, at a timing at which the comparison processing unit 19 obtains data on a colorimetric value, the display processing unit 20 displays color data based on the obtained data on the colorimetric value on a display, which is not illustrated in FIG. 1. The display is specifically, for example, a display 68 of the terminal device 60 described below but may be a display 38 of the colorimeter 30 or may be another display device. Hereafter, data on a colorimetric value may be referred to simply as a color value and color data may be referred to simply as a color.

The configuration of the colorimetry system 10 according to the present embodiment is not limited to this and may be modified in various ways, such as addition of another configuration. The colorimetry system 10 may further include, for example, a communicator that is not illustrated in FIG. 1. The communicator (not illustrated) mentioned here is a communication interface that performs wireless or wired communication with, for example, an external device, and may be implemented, for example, by hardware, such as a communication application specific integrated circuit (ASIC) or a communication processor, and communication firmware. The communicator (not illustrated), which communicates with an external device, for example, through near-field communication such as Bluetooth (registered trademark), may perform communication according to other standards such as Wi-Fi (registered trademark) or Universal Serial Bus (USB). In the case where, for example, the colorimetry system 10 includes the terminal device 60 and the colorimeter 30 described later, the terminal device 60 may include a communicator 69 described later as the communicator (not illustrated) and the colorimeter 30 may include a communicator 39 described later as the communicator (not illustrated), which enables the terminal device 60 to receive a color value from the colorimeter 30.

Figure 2:
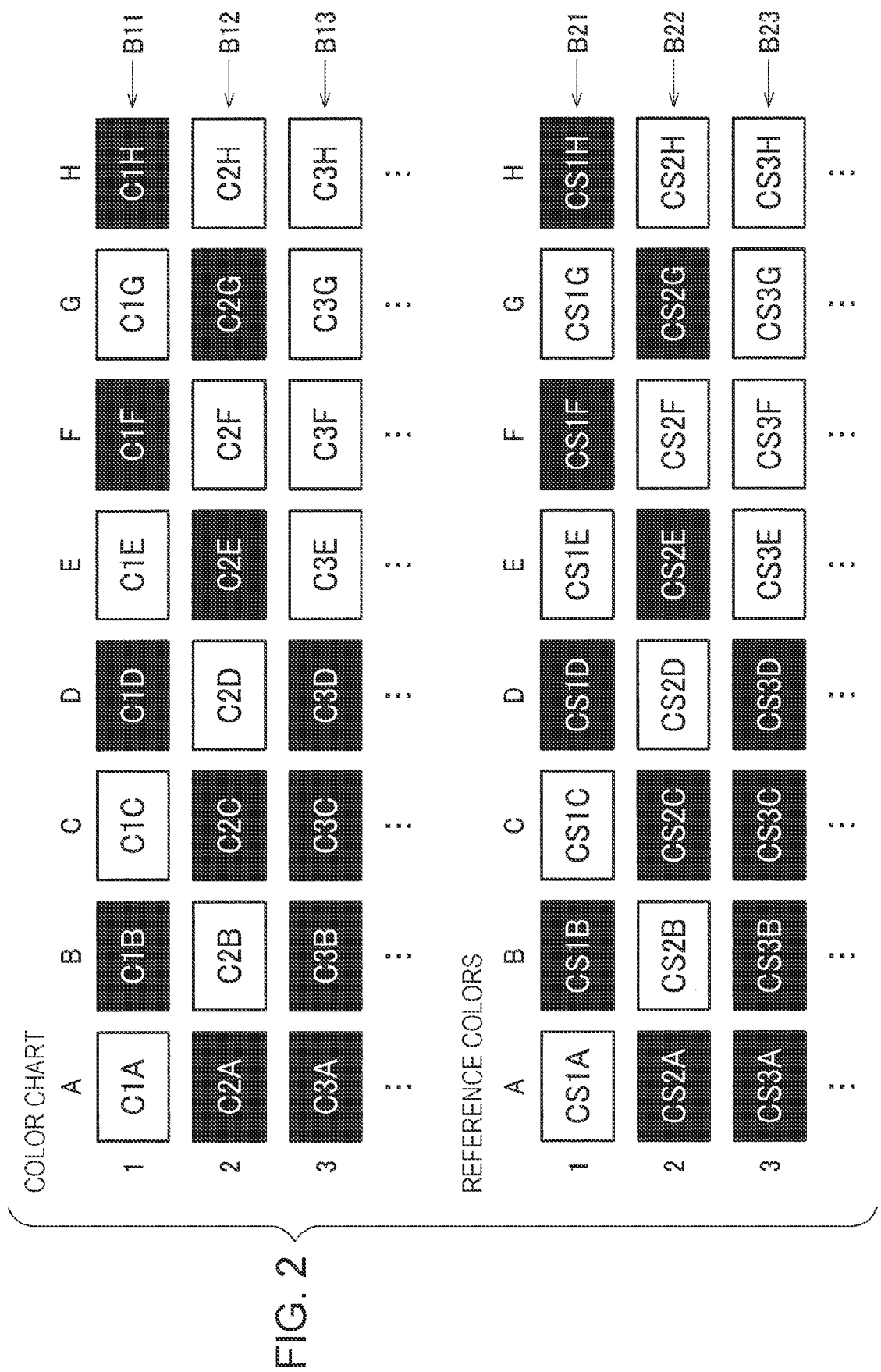
FIG. 2 is a diagram illustrating a color chart and reference colors.

FIG. 2 is a diagram illustrating a color chart, which is a specific example of an object of the line colorimetry, and a color group serving as reference colors. Although the line colorimetry is not limited to being used only for colorimetry on a color chart, objects of the line colorimetry may be referred to collectively as a color chart or the like. The color chart in FIG. 2 is a test pattern in which rows, each consisting of eight colors aligned in the horizontal direction, are aligned in the vertical direction. The user is able to distinguish rows aligned in the vertical direction on the color chart by means of numerals and to distinguish the respective positions of colors arranged in the horizontal direction in each row by means of alphabetical characters. Specifically, as indicated by B11, color C1A, color C1B, color C1C, color C1D, color C1E, color C1F, color C1G, and color C1H are aligned in the first row of the color chart. Similarly, as indicated by B12, color C2A, color C2B, color C2C, color C2D, color C2E, color C2F, color C2G, and color C2H are aligned in the second row of the color chart. Similarly, as indicated by B13, color C3A, color C3B, color C3C, color C3D, color C3E, color C3F, color C3G, and color C3H are aligned in the third row of the color chart.

A reference color group for performing colorimetry on the color chart is stored in the colorimetry system 10. Hereafter, the reference color group may be referred to simply as reference colors. Specifically, as indicated, for example, by B21, color CS1A, color CS1B, color CS1C, color CS1D, color CS1E, color CS1F, color CS1G, and color CS1H are stored, as the reference colors for comparison with the colors of the color chart in the row indicated by B11, in a storage that is not illustrated in FIG. 1. Similarly, as indicated by B22, color CS2A, color CS2B, color CS2C, color CS2D, color CS2E, color CS2F, color CS2G, and color CS2H are stored, as the reference colors for comparison with the colors of the color chart in the row indicated by B12, in the storage that is not illustrated in FIG. 1. Similarly, as indicated by B23, color CS3A, color CS3B, color CS3C, color CS3D, color CS3E, color CS3F, color CS3G, and color CS3H are stored, as the reference colors for comparison with the colors of the color chart in the row indicated by B13, in the storage that is not illustrated in FIG. 1. The storage may be implemented, for example, by the storage 66 in the terminal device 60 described below with reference to FIG. 6 but may be implemented by the storage 36 in the colorimeter 30.

The comparison processing unit 19 compares the color values of colors of the color chart in the first row indicated by B11 with the color values of colors of the reference colors in the first row indicated by B21, respectively, and decides whether the predetermined decision criteria are satisfied. More specifically, the comparison processing unit 19 compares color CS1A with color C1A, color CS1B with color C1B, color CS1C with color C1C, color CS1D with color C1D, color CS1E with color C1E, color CS1F with color C1F, color CS1G with color C1G, and color CS1H with color C1H. Similarly, the comparison processing unit 19 compares the color values of colors of the color chart in the second row indicated by B12 with the color values of colors of the reference colors in the second row indicated by B22, respectively, and decides whether the predetermined decision criteria are satisfied. More specifically, the comparison processing unit 19 compares color CS2A with color C2A, color CS2B with color C2B, color CS2C with color C2C, color CS2D with color C2D, color CS2E with color C2E, color CS2F with color C2F, color CS2G with color C2G, and color CS2H with color C2H. Similarly, the comparison processing unit 19 compares the color values of colors of the color chart in the third row indicated by B13 with the color values of colors of the reference colors in the third row indicated by B23, respectively, and decides whether predetermined decision criteria are satisfied. More specifically, the comparison processing unit 19 compares color CS3A with color C3A, color CS3B with color C3B, color CS3C with color C3C, color CS3D with color C3D, color CS3E with color C3E, color CS3F with color C3F, color CS3G with color C3G, and color CS3H with color C3H. The predetermined decision criteria will be described below. In addition, in the description given below, comparison between the colors of the color chart in the first row and the colors of the reference colors in the first row may be referred to, for example, as comparison between the color chart in the first row and the reference colors in the first row.

Figure 3:
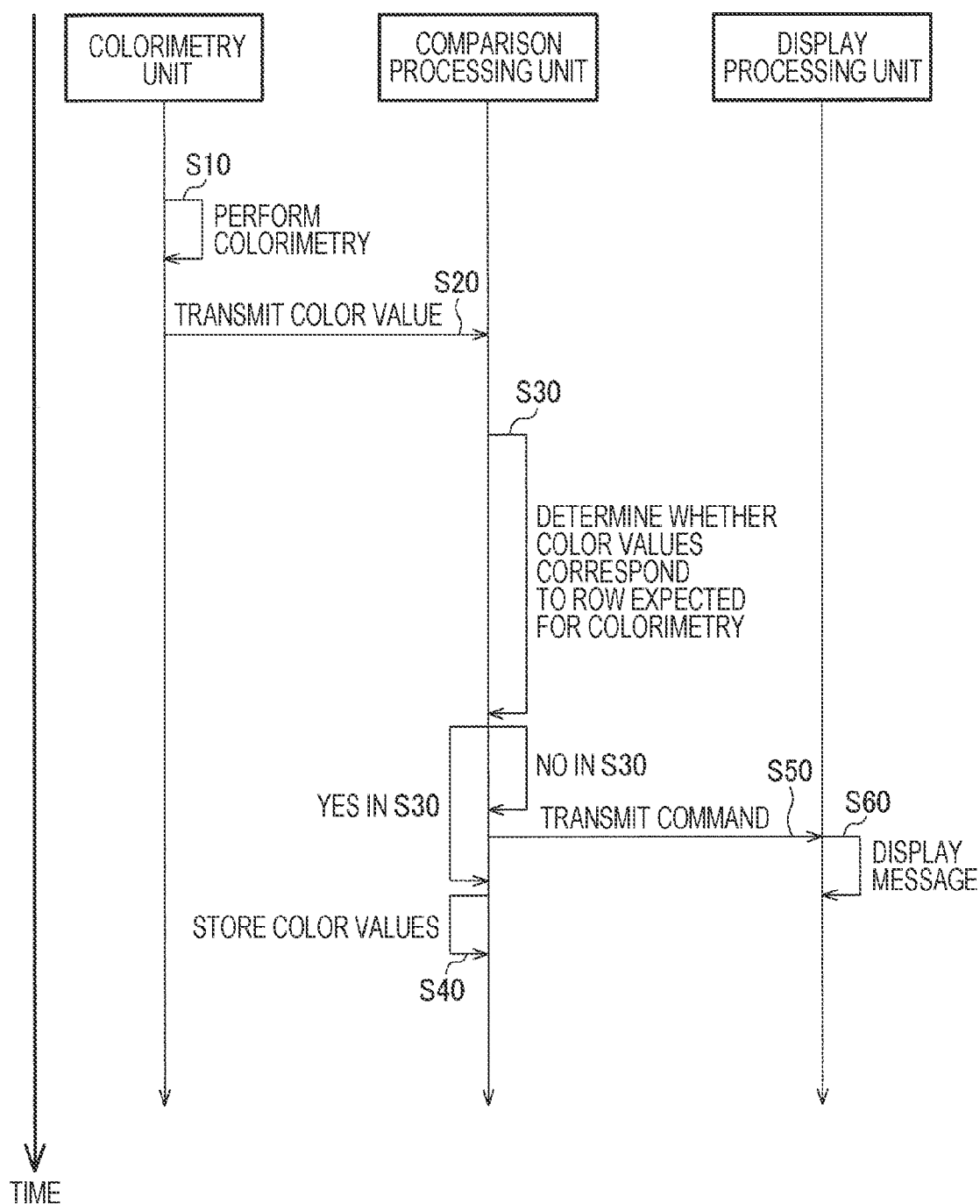
FIG. 3 is a diagram illustrating the flow of a process according to the present embodiment.

FIG. 3 is a diagram illustrating the flow of a process of the colorimetry system 10 according to the present embodiment. The colorimetry unit 12 performs colorimetry (step S10) and transmits a color value to the comparison processing unit 19 (step S20). Although partially omitted in the figure, the process in step S10 and the process in step S20 are performed repeatedly until completion of colorimetry on one line of the color chart described above. Hereafter, the process in step S10, for example, may be referred to simply as step S10 or the like. Then, the comparison processing unit 19 determines whether the received color values correspond to a row expected for colorimetry (step S30). The row expected for colorimetry is a row of reference colors set as comparison targets of colorimetry. Specifically, in the case of performing colorimetry on the color chart in the first row indicated by B11 in FIG. 2, for example, reference colors in the first row indicated by B21 in FIG. 2 constitute a row expected for colorimetry, and the comparison processing unit 19 determines, according to predetermined determination criteria described below, whether the received color values correspond to the reference colors in the first row. If the received color values correspond to a row expected for colorimetry (Yes in step S30), the comparison processing unit 19 stores the color values (step S40). However, if the received color values do not correspond to the row expected for colorimetry (No in step S30), the comparison processing unit 19 issues a command meaning this situation and transmits the command to the display processing unit 20 (step S50). Although the process is not illustrated in the figures, if NO in step S30, data on the received color values is not immediately deleted and is temporarily stored in a storage that is not illustrated in the figures. The display processing unit 20 displays a message in response to the received command (step S60). The message display (step S60) is a display process of displaying, for example, a message screen 80 requesting the user to perform predetermined verification.

Figure 4:
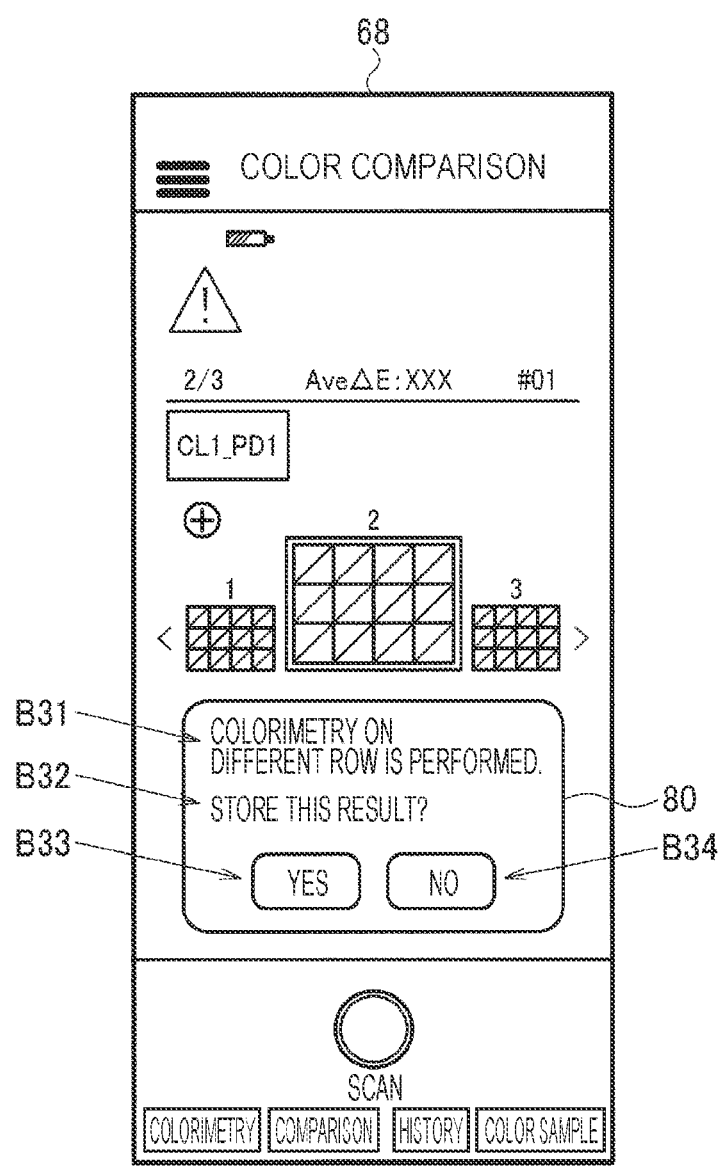
FIG. 4 is a screenshot of a message screen.

Then, the display processing unit 20 displays a message screen 80 as illustrated in FIG. 4. Although the example in FIG. 4 is an example in which the screenshot is displayed on the display 68 of the terminal device 60 described below with reference to FIG. 6, the screenshot is not limited to this and may be displayed, for example, on the display 38 of the colorimeter 30 described below or may be displayed on another display device. Screenshots described hereafter will be displayed on the display 68 as the representative of the displays and display devices. On the message screen 80, the display processing unit 20 displays a message to the effect that colorimetry on a row including the color chart corresponding to a row expected for colorimetry is not performed, as indicated by B31. On the message screen 80, the display processing unit 20 also displays a message prompting the user to select whether to store a result obtained by colorimetry, as indicated by B32, a "Yes" icon indicated by B33, and a "No" icon indicated by B34. For example, when the user selects the "Yes" icon indicated by B33, a colorimetric result that has been temporarily stored is officially stored. In contrast, for example, when the user selects the "No" icon indicated by B34, the colorimetric result that has been temporarily stored is discarded. Although not illustrated in the figures, when determining that the color chart on which colorimetry has been performed corresponds to the row expected for colorimetry, the comparison processing unit 19 performs, for example, a process of displaying the next row expected for colorimetry.

As described above, the colorimetry system 10 according to the present embodiment includes the comparison processing unit 19 that performs a comparison process for the color values of colors obtained by colorimetry performed by the colorimetry unit 12, which is in charge of colorimetry, and the display processing unit 20 that performs a process of displaying a comparison processing result obtained by the comparison processing unit 19. The comparison processing unit 19 determines whether the colors of a row on which colorimetry is performed correspond to the colors of a row expected for colorimetry (step S30) and, if the colors of the row on which colorimetry is performed correspond to the colors of the row expected for colorimetry (Yes in step S30), performs a process of storing data on the colors of the row on which colorimetry is performed (step S40). If the colors of the row on which colorimetry is performed do not correspond to the colors of the row expected for colorimetry (No in step S30), the display processing unit 20 performs a display process of asking the user whether to store data on the colors obtained by colorimetry (step S60). In such a manner, since the colorimetry system 10 according to the present embodiment includes the comparison processing unit 19 and the display processing unit 20, a comparison result between the colors obtained by colorimetry performed by the colorimetry unit 12 and the reference colors may be displayed. In addition, the comparison processing unit 19 may determine whether the colors of the row on which colorimetry is performed correspond to the colors of the row expected for colorimetry and therefore may determine whether, when the user performs line colorimetry, colorimetry on a proper line is performed. In addition, when the colors of the row on which colorimetry is performed do not correspond to the colors of the row expected for colorimetry, the display processing unit 20 may perform the display process of asking the user whether to store data on the colors obtained by colorimetry, and therefore the user may determine whether to store colorimetric data that is determined not to correspond to the row expected for colorimetry. Thus, for example, when the user stores the line on which colorimetry has been performed, colorimetry is not to be performed again. This may reduce the burden of colorimetry work imposed on the user. In addition, for example, in the case where the line on which the user has performed colorimetry is obviously correct, it may be determined that data obtained by colorimetry is to be stored in order to verify the color chart or the like and reference colors. Note that examples of the case where the line on which the user has performed colorimetry is obviously correct include the case where there are just one row of the color chart or the like and just one row of reference colors.

In addition, the techniques of the present embodiment may be implemented as a processing method. That is, the processing method according to the present embodiment performs the comparison process of performing comparison for the color values of colors obtained by colorimetry performed by the colorimetry unit 12, which is in charge of colorimetry, the display process of displaying a comparison processing result obtained through the comparison process, and a process of determining whether the colors of a row on which colorimetry is performed correspond to the colors of the row expected for colorimetry. In addition, if the colors of a row on which colorimetry is performed correspond to the colors of a row expected for colorimetry, the processing method according to the present embodiment performs a process of storing data on the colors of the row on which colorimetry is performed. If not, the processing method according to the present embodiment performs the display process of asking the user whether to store data on the colors obtained by colorimetry. Thus, the effects similar to those described above may be obtained.

In addition, the techniques of the present embodiment may be implemented as a program. That is, the program according to the present embodiment causes a computer to function as the comparison processing unit 19 that performs a comparison process for the color values of colors obtained by colorimetry performed by the colorimetry unit 12, which is in charge of colorimetry, and the display processing unit 20 that performs a process of displaying a comparison processing result obtained by the comparison processing unit 19. The comparison processing unit 19 determines whether the colors of a row on which colorimetry is performed correspond to the colors of a row expected for colorimetry and, if the colors of the row on which colorimetry is performed correspond to the colors of the row expected for colorimetry, performs a process of storing data on the colors of the row on which colorimetry is performed. If the colors of the row on which colorimetry is performed do not correspond to the colors of the row expected for colorimetry, the display processing unit 20 performs a display process of asking the user whether to store data on the colors obtained by colorimetry. Thus, the effects similar to those described above may be obtained.

The techniques of the present embodiment may be implemented as the terminal device 60 described below with reference to FIG. 6 and so on. That is, the terminal device 60 according to the present embodiment includes a terminal comparison processing unit 65 described below that performs a comparison process for the color values of colors obtained by colorimetry performed by the colorimeter 30, which is in charge of colorimetry, and a terminal display processing unit 67 described below that performs a process of displaying a comparison processing result obtained by the terminal comparison processing unit 65. The terminal comparison processing unit 65 determines whether the colors of a row on which colorimetry is performed correspond to the colors of a row expected for colorimetry and, if the colors of the row on which colorimetry is performed correspond to the colors of the row expected for colorimetry, performs a process of storing data on the colors of the row on which colorimetry is performed. If the colors of the row on which colorimetry is performed do not correspond to the colors of the row expected for colorimetry, the terminal display processing unit 67 performs a display process of asking the user whether to store data on the colors obtained by colorimetry. Thus, the effects similar to those described above may be obtained.

Next, the predetermined decision criteria mentioned above with reference to FIG. 2 will be described. FIG. 5 illustrates an example of colorimetric results obtained when line colorimetry was performed by comparing the color chart in the first row, the second row, and the third row indicated by B11, B12, and B13, respectively, in FIG. 2 with the reference colors in the first row indicated by B21. That is, the colorimetric results in the first row in FIG. 5 are colorimetric results obtained by line colorimetry performed by the user comparing the color chart in the first row with the reference values in the first row. That is, the colorimetric results in the first row are colorimetric results obtained by the comparison processing unit 19 comparing color CS1A with color C1A, color CS1B with color C1B, color CS1C with color C1C, color CS1D with color C1D, color CS1E with color C1E, color CS1F with color C1F, color CS1G with color C1G, and color CS1H with color C1H. Similarly, the colorimetric results in the second row in FIG. 5 are colorimetric results obtained by line colorimetry performed by the user accidentally comparing the color chart in the second row with the reference values in the first row. That is, the colorimetric results in the second row are colorimetric results obtained by the comparison processing unit 19 comparing color CS1A with color C2A, color CS1B with color C2B, color CS1C with color C2C, color CS1D with color C2D, color CS1E with color C2E, color CS1F with color C2F, color CS1G with color C2G, and color CS1H with color C2H. Similarly, the colorimetric results in the third row in FIG. 5 are colorimetric results obtained by line colorimetry performed by the user accidentally comparing the color chart in the third row with the reference values in the first row. That is, the colorimetric results in the third row are colorimetric results obtained by the comparison processing unit 19 comparing color CS1A with color C3A, color CS1B with color C3B, color CS1C with color C3C, color CS1D with color C3D, color CS1E with color C3E, color CS1F with color C3F, color CS1G with color C3G, and color CS1H with color C3H.

The predetermined decision criteria as used herein are such that, for example, the average color difference Ave $\Delta E$ in the row on which colorimetry is performed is less than or equal to a permissible color difference P$\Delta E$. The permissible color difference P$\Delta E$ as used herein is assumed to be, for example, 20.0 but may be set as appropriate by the user. The average color difference Ave $\Delta E$ in the colorimetric results of the color chart in the first row mentioned above is 0.3, which satisfies the predetermined decision criteria, and therefore the comparison processing unit 19 decides that the first row including the color chart on which colorimetry was performed by the user is a correct row. In contrast, the average color difference Ave $\Delta E$ in the colorimetric results of the color chart in the second row is 99, which does not satisfy the predetermined decision criteria, and therefore the comparison processing unit 19 decides that the row including the color chart on which line colorimetry was performed by the user is not the correct row. Similarly, the average color difference Ave $\Delta E$ in the colorimetric results of the color chart in the third row is 53.0, which does not satisfy the predetermined decision criteria, and therefore the comparison processing unit 19 decides that the row including the color chart on which line colorimetry was performed by the user is not the correct row. As described above, in the colorimetry system 10 according to the present embodiment, the comparison processing unit 19 performs, as the process of determining whether the colors of a row on which colorimetry is performed correspond to the colors of the row expected for colorimetry, a process of determining, based on the color difference average value between the colors of the row on which colorimetry is performed and the colors of the row expected for colorimetry, whether the color difference average value is less than or equal to the predetermined permissible color difference PΔE. If the color difference average value is less than or equal to the predetermined permissible color difference PΔE, it is determined that the colors of the row on which colorimetry is performed correspond to the colors of the row expected for colorimetry, whereas if the color difference average value is greater than the predetermined permissible color difference PΔE, it is determined that the colors of the row on which colorimetry is performed do not correspond to the colors of the row expected for colorimetry. The color difference average value, which corresponds to the average color difference Ave ΔE, is an arithmetic value of color differences, which are obtained by calculating a color difference between the color obtained by colorimetry actually performed and a color expected to be obtained by colorimetry for each of the colors in a row. In such a way, the criteria for the determination of whether a line colorimetry error has occurred may be clarified. This enables the user to distinguish a colorimetric result obtained when the row including the color chart or the like on which colorimetry is performed is a correct row, from a colorimetric result obtained when the row including the color chart or the like on which colorimetry is performed is not the correct row. Note that, in addition, it may be determined for each of the colors of a row whether the color difference between the color actually obtained by colorimetry and the color expected to be obtained by colorimetry is within a predetermined permissible color difference. If the color differences for all the colors are within the predetermined permissible color difference, it may be determined that the colors of the row on which colorimetry is performed correspond to the colors of the row expected for colorimetry, whereas if even one color is greater than the predetermined permissible color difference, it may be determined that the colors of the row on which colorimetry is performed do not correspond to the colors of the row expected for colorimetry. In addition, although the term "correspond" is used here, the term "match" may be used instead. The term "match", with which a mismatch within the permissible color difference is tolerated, is not limited to a complete match.

The predetermined decision criteria are not limited to those described above and may be modified in various ways. For example, the variance and the like in addition to the average in the color difference ΔE may be considered as the predetermined decision criteria. In addition, the predetermined determination criteria may be set in consideration of a plurality of decision criteria.

Figure 7:
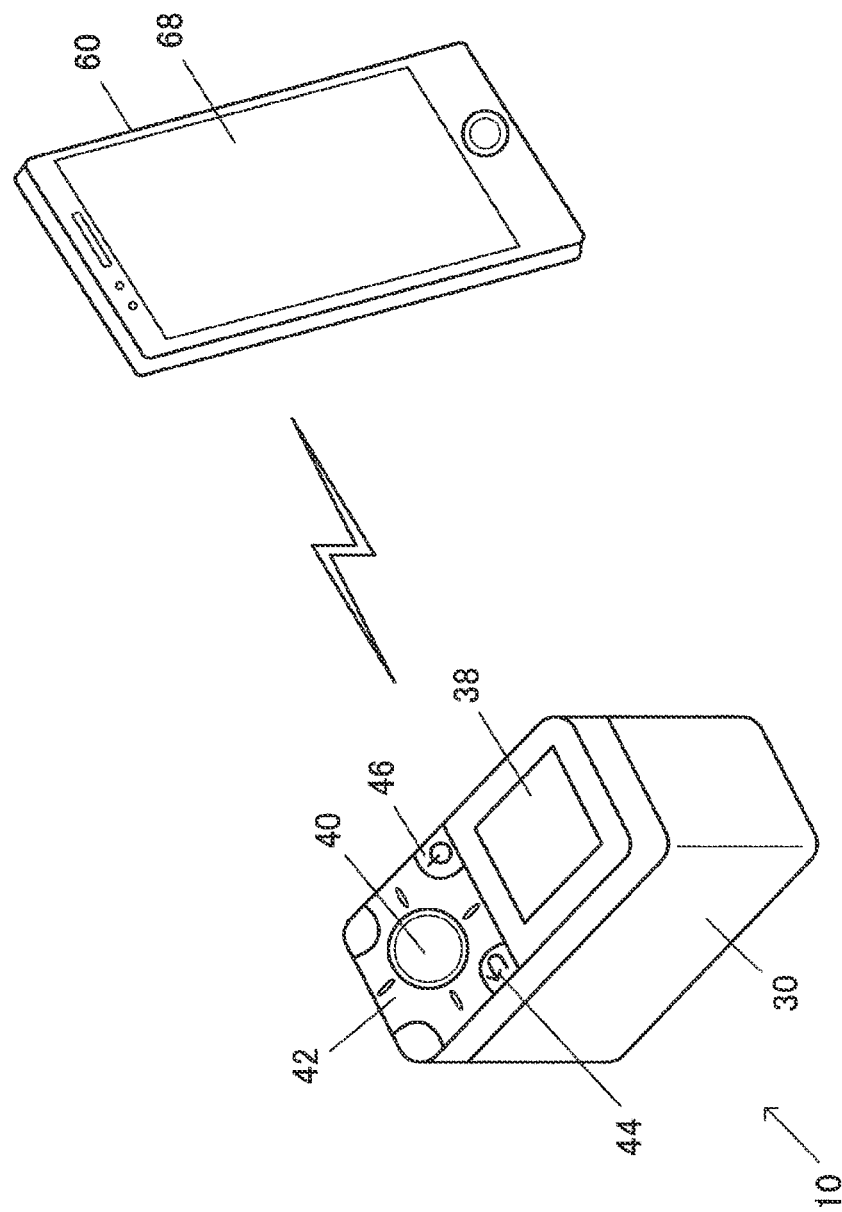
FIG. 7 is a diagram illustrating an example of the appearances of the colorimeter and the terminal device.
Figure 8:
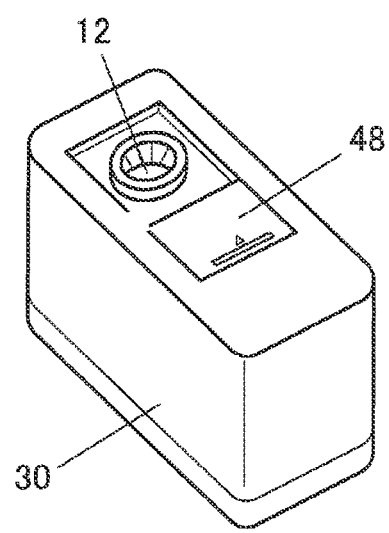
FIG. 8 is another diagram illustrating an example of the appearance of the colorimeter.

The colorimetry system 10 according to the present embodiment is not limited to that described above and may be modified in various ways, such as addition of other components. For example, as illustrated in FIGS. 6, 7, and 8, the terminal device 60 and the colorimeter 30 may constitute the colorimetry system 10. FIG. 6 is a block diagram illustrating an exemplary configuration of the colorimeter 30 and the terminal device 60 constituting the colorimetry system 10 according to the present embodiment, FIG. 7 is a diagram illustrating an example of the appearances of the colorimeter 30 and the terminal device 60, and FIG. 8 is a diagram illustrating another example of the appearance of the colorimeter 30. FIGS. 6 to 8 are exemplary and, for example, the colorimetry system 10 according to the present embodiment may include only the colorimeter 30 and may be modified in various ways. In addition, the appearance of the colorimeter 30 is not limited to the examples illustrated in FIGS. 7 and 8, and the appearance of the terminal device 60 is not limited to the example illustrated in FIG. 7.

The terminal device 60 is a communication terminal capable of being communicatively coupled with the colorimeter 30 and is implemented by, for example, a smartphone or a tablet personal computer (PC). The terminal device 60 is communicatively coupled with the colorimeter 30, for example, through wireless communication such as Bluetooth or Wi-Fi. The terminal device 60 includes the display 68 and is provided with an operation device such as an operation button. Additionally, the display 68 is, for example, a touch panel, and the user performs various operations by touching the display 68, which is a touch panel.

The colorimeter 30 includes the colorimetry unit 12, the processing unit 32, an operation unit 34, the storage 36, the display 38, and the communicator 39. The colorimetry unit 12 is implemented by a colorimetric sensor or the like as mentioned above.

The processing unit 32 performs processes of controlling the components of the colorimeter 30 and processes according to the present embodiment. For example, the processing unit 32 performs a process of controlling the colorimetry unit 12 and a process of obtaining colorimetric data from the colorimetry unit 12. In addition, the processing unit 32 performs an input process of operation information of a user input through the operation unit 34, a process of reading out information from the storage 36, and a process of writing information to the storage 36. In addition, the processing unit 32 performs a process of displaying information on the display 38, a process of controlling communication of the communicator 39, and so on. The processing unit 32 may be implemented by a processor. For example, the processes according to the present embodiment may be implemented by a processor that operates based on information such as programs and a memory that stores information such as programs. The memory is the storage 36. Regarding the processor, for example, the functions of components may be implemented by individual pieces of hardware or the functions of components may be implemented by integrated hardware. For example, the processor includes hardware, which may include at least one of circuitry that processes digital signals and circuitry that processes analog signals. For example, the processor may be constituted of one or more circuit devices and one or more circuit elements mounted on a circuit board. The processor may be, for example, a central processing unit (CPU). However, the processor is not limited to a CPU, and various processors such as a graphics processing unit (GPU) and a digital signal processor (DSP) may be used. The processor may also be hardware circuitry implemented by an ASIC. The processor may also include an amplifier circuit, a filter circuit, and so on that process analog signals.

The operation unit 34 is an operation interface to which the operation information of a user is input. The operation unit 34 may be implemented by operating devices. With reference to FIG. 7 by way of example, the operation unit 34 may be implemented by operating devices such as a colorimetry button 40, a directional pad (D-pad) 42, a back button 44, and a power button 46. However, the operating devices implementing the operation unit 34 are not limited to these operating devices.

The storage 36 stores various types of information. For example, the storage 36 stores programs and data. The storage 36 functions as a work area, for example, for the processing unit 32 and the communicator 39. The storage 36, which is, for example, a memory, may be a semiconductor memory such as a static random access memory (SRAM) or a dynamic random access memory (DRAM), may be a register, or may be a hard disk device or the like. The storage 36, which is, for example, a memory, stores computer-readable instructions, which, when executed by the processing unit 32 as a processor, cause the processing unit 32 to perform the processes of the components. The instructions as used herein may be an instruction set constituting a program or may be instructions for instructing the hardware circuit of the processor to perform operations.

The display 38 displays various types of information for the user. The display 38 may be implemented, for example, by various displays such as a liquid crystal display and an organic electroluminescent (EL) display. The display 38 displays, for example, information used when the user operates the colorimeter 30, various types of status information of the colorimeter 30, and the like.

The communicator 39 is a communication interface that performs wireless or wired communication with external devices. The communicator 39 may be implemented, for example, by hardware, such as a communication ASIC or a communication processor, communication firmware, and so on. For example, the communicator 39 communicates with an external device such as the terminal device 60, for example, using near-field wireless communication such as Bluetooth (registered trademark). Specifically, the communicator 39 communicates with an external device using wireless communication according to Bluetooth Low Energy (BLE) standards. Alternatively, the communicator 39 may communicate with an external device using wireless communication according to other standards such as Wi-Fi. In addition, the communicator 39 may perform wired communication according to standards such as USB.

The terminal device 60 includes the processing unit 62, an operation unit 64, the storage 66, the display 68, and the communicator 69.

The processing unit 62 performs control processes of the components of the terminal device 60 and processes according to the present embodiment. For example, the processing unit 62 performs a process of inputting operation information of a user input through the operation unit 64, a process of reading out information from the storage 66, and a process of writing information to the storage 66. In addition, the processing unit 62 performs a process of displaying information on the display 68, a process of controlling communication of the communicator 69, and so on. The processing unit 62 is implemented by a processor or the like mentioned above.

The operation unit 64 is an operation interface to which the operation information of a user is input. The operation unit 64 may be implemented by operating devices. With reference to FIG. 7 by way of example, the operation unit 64 may be implemented by operating devices such as a touch panel of the display 68 and operation buttons provided on the terminal device 60. However, the operating devices implementing the operation unit 64 are not limited to these operating devices.

The storage 66 stores various types of information. For example, the storage 66 stores programs and data. The storage 66 functions as a work area, for example, for the processing unit 62 and the communicator 69. The storage 66, which is, for example, a memory, may be a semiconductor memory such as an SRAM or a DRAM, may be a register, or may be a hard disk device or an optical disk device. The storage 66, which is, for example, a memory, stores computer-readable instructions, which, when executed by the processing unit 62 as a processor, cause the processing unit 62 to perform the processes of the components.

The display 68 displays various types of information for the user. The display 68 may be implemented, for example, by various displays such as a liquid crystal display and an organic EL display. In addition, the display 68 is implemented, for example, by a touch panel and also functions as the operation unit 64. The display 68 displays, for example, information used when the user operates the terminal device 60, various types of status information of the terminal device 60 and the colorimeter 30, and the like.

The communicator 69 is a communication interface that performs wireless or wired communication with external devices. The communicator 69 may be implemented, for example, by hardware, such as a communication ASIC or a communication processor, communication firmware, and so on. For example, the communicator 69 communicates with an external device such as the colorimeter 30, for example, using near-field communication such as Bluetooth (registered trademark). Specifically, the communicator 69 communicates with an external device using wireless communication according to BLE standards. Alternatively, the communicator 69 may communicate with an external device using wireless communication according to other standards such as Wi-Fi. In addition, the communicator 69 may perform wired communication according to standards such as USB.

As described above, the process of the colorimetry system 10 according to the present embodiment may be implemented, for example, by the processing unit 62 of the terminal device 60. In this case, the processing unit 62 includes the processing unit 18, the display processing unit 20, and the comparison processing unit 19 and performs the processes of these components. For example, as illustrated in FIG. 6, the processing unit 62 may include the terminal comparison processing unit 65 and the terminal display processing unit 67. In this case, the terminal comparison processing unit 65 corresponds to the comparison processing unit 19 in FIG. 1, and the terminal display processing unit 67 corresponds to the display processing unit 20 in FIG. 1. In addition, for example, the program according to the present embodiment is installed as an application program in the terminal device 60 and is stored in the storage 66, and the application program executes the processes of the processing unit 18, the display processing unit 20, and the comparison processing unit 19. Alternatively, the processes of the colorimetry system 10 may be implemented by the processing unit 32 of the colorimeter 30. In this case, the processing unit 32 includes the processing unit 18, the display processing unit 20, and the comparison processing unit 19 and performs the processes of these components. For example, the program stored in the storage 36 executes the processes of the processing unit 18, the display processing unit 20, and the comparison processing unit 19. Alternatively, the processes of the colorimetry system 10 may be implemented by a distribution process between the processing unit 32 and the processing unit 62.

The colorimeter 30 depicted in FIG. 7 has, for example, a substantially cubic shape, on the top surface of which the display 38, the colorimetry button 40, and the D-pad 42 are provided. On the top surface of the colorimeter 30, the back button 44 and the power button 46 are also provided. As depicted in FIG. 8, the colorimetry unit 12 and a shutter 48 are provided on the bottom surface of the colorimeter 30. The display 38 is implemented, for example, by various displays such as a liquid crystal display and an organic EL display and displays various types of information for the user. The colorimetry button 40 is an operating device for instructing the user to cause the colorimeter 30 to perform colorimetry. For example, by the user depressing the colorimetry button 40, the colorimeter 30 performs colorimetry using the colorimetry unit 12. The D-pad 42 is an operating device, for example, for instructing the directions to the left, right, top, and bottom. The back button 44 is a button for performing an operation called a back operation, and the power button 46 is a button for switching on and off the power of the colorimeter 30. The colorimetry unit 12 is implemented by a colorimetric sensor as mentioned above and, for example, is substantially circular as viewed in plan view. The shutter 48 protects the colorimetry unit 12 when the colorimeter 30 is not used. For example, when the user does not use the colorimeter 30, the user performs an operation of closing the shutter 48 by moving the shutter 48 toward the colorimetry unit 12, so that an impact or the like from the outside is not applied to the colorimetry unit 12.

The colorimeter 30 depicted in FIG. 7 and FIG. 8 is shaped to allow the user to hold it with one hand for colorimetry. For example, the user holds the side surface of the colorimeter 30 with the thumb and, for example, the middle, ring, or little finger and performs an operation of pressing the colorimetry button 40, an operation of pointing out the direction using the D-pad 42, and so on with the index finger. However, the colorimeter 30 depicted in FIGS. 7 and 8 is exemplary and the colorimeter 30 having another shape may be used.

Next, with reference to FIGS. 9, 10, 11, 12, and 13, a more detailed process according to the techniques of the present embodiment will be described. The screenshots and the like to which process examples in FIGS. 9 to 13 are specifically applied will be described below with reference to FIG. 17 and the subsequent figures. In addition, although it has been described above that the functions of the comparison processing unit 19 are implemented more specifically by the terminal comparison processing unit 65 or the like, the subject of the processes performed by the comparison processing unit 19 is uniformly represented as the comparison processing unit 19 hereafter. Similarly, the subject of the processes performed by the display processing unit 20 is uniformly represented as the display processing unit 20 hereafter.

Figure 9:
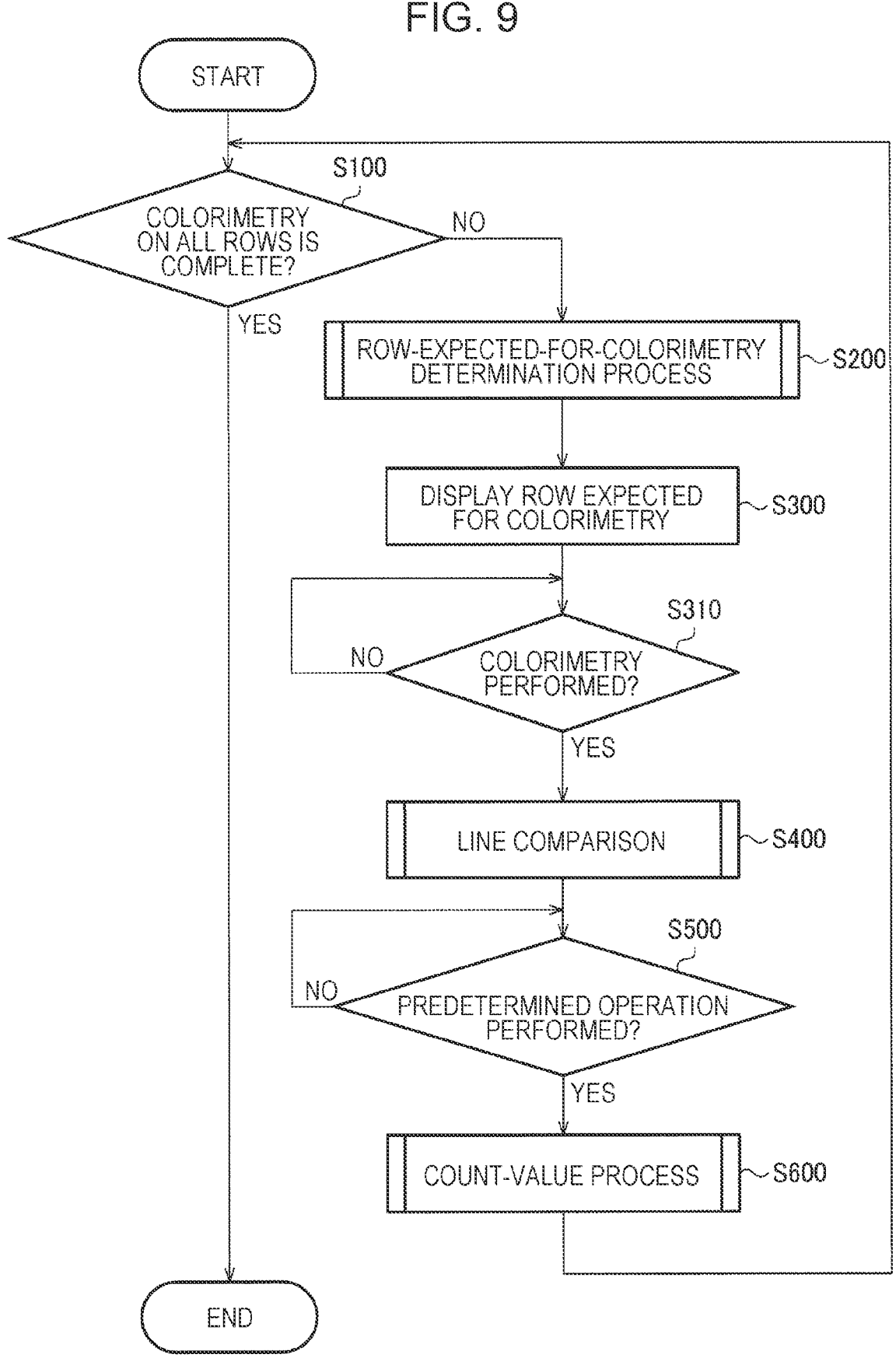
FIG. 9 is a flowchart illustrating an example of a detailed process according to the present embodiment.

FIG. 9 is a flowchart illustrating a process example of the line colorimetry according to the present embodiment. The colorimetry system 10 performs a process of determining whether colorimetry on all the rows is complete (step S100). The colorimetry system 10 terminates the flow if colorimetry on all the rows is complete (Yes in step S100), but performs the row-expected-for-colorimetry determination process (step S200) described below with reference to FIG. 10 if colorimetry on all the rows is not complete (No in step S100). Specifically, for example, the colorimetry system 10 may implement step S100 by determining whether all the colorimetry completion flags are on, which is described below, or by determining whether a second count value is greatest, which is described below with reference to FIG. 13 and so on.

After performing the row-expected-for-colorimetry determination process (step S200) described below with reference to FIG. 10, the colorimetry system 10 displays the row expected for colorimetry (step S300). For example, through the row-expected-for-colorimetry determination process (step S200) described below, the comparison processing unit 19 determines a row expected for colorimetry from among reference colors corresponding to a row including the color chart or the like on which colorimetry is not yet performed, and transmits a command meaning this determination to the display processing unit 20. The display processing unit 20 displays, on the display 68, reference colors and the like involved in the row expected for colorimetry. A more specific description of screenshots will be given below.

Then, the colorimetry system 10 determines whether the user has performed colorimetry (step S310) and, if the user has performed colorimetry (Yes in step S310), performs line comparison (step S400) described below with reference to FIG. 11. However, if the user has not performed colorimetry (No in step S310), the colorimetry system 10 repeats step S310. That is, unless the user performs operations for colorimetry, the reference colors involved in the row expected for colorimetry displayed in step S300 continue to be displayed.

After performing line comparison (step S400) described below with reference to FIG. 11, the colorimetry system 10 determines whether the user has performed a predetermined operation (step S500) and, if the user has performed the predetermined operation (Yes in step S500), performs a count-value process (step S600) described below with reference to FIG. 13 and performs step S100 again. However, if the user has not performed the predetermined operation (No in step S500), the colorimetry system 10 repeats step S500. Here, the predetermined operation is, for example, an operation in which the user selects one from the icons displayed on the message screen 80. The message screen 80 continues to be displayed unless, for example, the user performs the predetermined operation. In the flow illustrated in FIG. 9, step S500 may be omitted in a predetermined case. Examples of the predetermined case include the case in which the color chart or the like, corresponding to the row expected for colorimetry, on which colorimetry has been performed by the user is the correct row and therefore step S422 described below is performed and the message screen 80 is not displayed.

Figure 10:
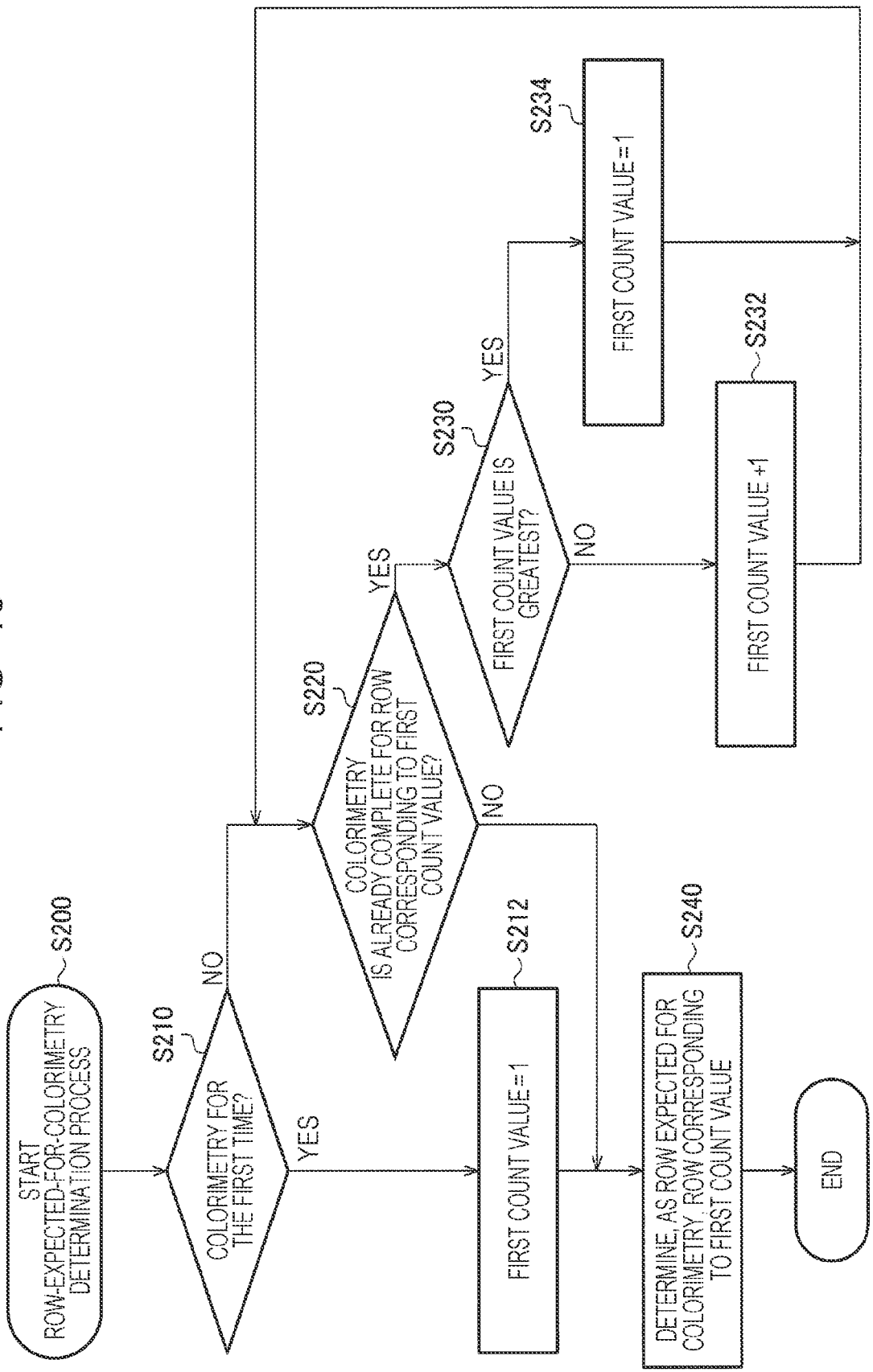
FIG. 10 is a flowchart illustrating a process example of a row-expected-for-colorimetry determination process.

FIG. 10 is a flowchart illustrating a process example of the row-expected-for-colorimetry determination process (step S200) mentioned above. The comparison processing unit 19 determines whether the colorimetry is performed for the first time (step S210). Specifically, for example, the comparison processing unit 19 may perform step S210 by verifying whether a colorimetry start flag is on. The colorimetry start flag is a flag with which it is determined whether a program for line colorimetry of the colorimetry system 10 is started and thus line colorimetry is performed for the first time. The colorimetry start flag is off upon start of the program for line colorimetry. If row colorimetry is performed for the first time (Yes in step S210), the comparison processing unit 19 sets a first count value to one (step S212) and performs step S240 described below. The first count value as used herein is a value corresponding to the row number related to the row expected for colorimetry. For example, when colorimetry on five rows of the color chart is performed, five rows of the corresponding reference colors are present and therefore the first count value may be a natural number from one to five. That is, according to the present embodiment, when the user starts the program for line colorimetry, the comparison processing unit 19 initializes the reference colors in the first row to the row expected for colorimetry and, in step S300 in FIG. 9, the reference colors in the first row are displayed as the row expected for colorimetry. Note that, for example, the comparison processing unit 19 may turn on the colorimetry start flag by performing step S240 described below. In this case, in the row-expected-for-colorimetry determination process (step S200) performed thereafter, the result of the determination in step S210 continues to be No.

However, row colorimetry is not performed for the first time (No in step S210), the comparison processing unit 19 determines whether colorimetry is already complete for a row corresponding to the first count value (step S220). If colorimetry is already complete for the row corresponding to the first count value (Yes in step S220), the comparison processing unit 19 determines whether the first count value is greatest (step S230). The row corresponding to the first count value as used herein is, among the rows of reference colors, a row having a row number equal to the first count value. For example, when the first count value is two, the reference colors in the second row are mentioned. In addition, the row for which colorimetry is already complete is, among rows of reference colors, a row for which a colorimetric result of colorimetry with the corresponding color chart or the like is already stored. For example, the colorimetry system 10 includes the same number of colorimetry completion flags as the number of rows of reference colors and, upon storing a colorimetric result in step S422 and so on described below, the comparison processing unit 19 performs a process (not illustrated) of turning on colorimetry completion flags corresponding to the rows of reference colors. The comparison processing unit 19 may perform step S220 by verifying whether the colorimetry completion flag of the row corresponding to the first count value is on or off. However, if colorimetry is already complete for the row corresponding to the first count value (No in step S220), the comparison processing unit 19 performs step S240 described below.

If the first count value is not greatest (No in step S230), the comparison processing unit 19 increments the first count value by one (step S232) and performs step S220 again. However, if the first count value is greatest (Yes in step S230), the comparison processing unit 19 sets the first count value to one (step S234) and performs step S220 again. Specifically, in the case of performing colorimetry on five rows of the color chart, for example, when it is determined that colorimetry on the color chart in the bottom, fifth row is complete but a row on which colorimetry is not yet performed is present, the comparison processing unit 19 determines, in steps S234 and S220, whether colorimetry is already complete for the reference colors in the top, first row. Then, the comparison processing unit 19 determines, in steps S232 and S220, whether colorimetry is already complete for the reference colors in the second and subsequent rows.

Then, the comparison processing unit 19 determines, as the row expected for colorimetry, a row of the reference colors corresponding to the first count value after step S212 described above or when No is determined in step S220 (step S240). Thereby, in step S300 illustrated in FIG. 9 described above, the reference colors determined as the row expected for colorimetry are displayed on the display 68.

Figure 11:
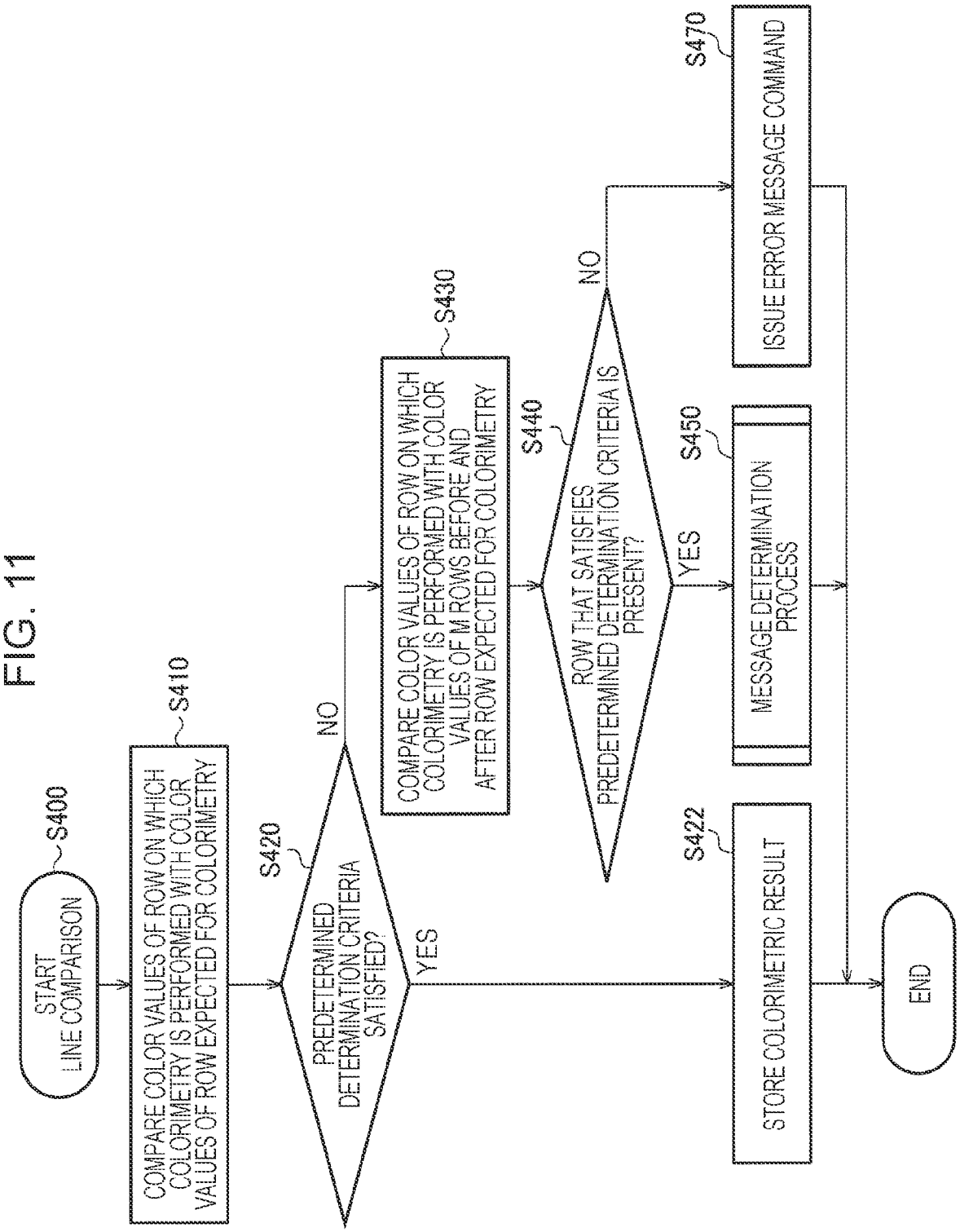
FIG. 11 is a flowchart illustrating a process example of line comparison.

FIG. 11 is a flowchart illustrating a process example of line comparison (step S400). The comparison processing unit 19 compares the color chart or the like in the row on which colorimetry is performed with the reference colors in the row expected for colorimetry (step S410) and determines whether the predetermined determination criteria described above are satisfied (step S420). The predetermined determination criteria as used herein are the average color difference Ave ΔE being less than or equal to the permissible color difference PΔE, and the like, as described above but may be other determination criteria. If the predetermined determination criteria are satisfied (Yes in step S420), the comparison processing unit 19 stores a colorimetric result, which is a result of the comparison between the color chart or the like on which colorimetry is performed and the reference colors in the row expected for colorimetry, (step S422) and terminates the flow. That is, step S420 in FIG. 11 corresponds to step S30 in FIG. 3, and step S422 in FIG. 11 corresponds to step S40 in FIG. 3.

Next, the process will be described if the result of the determination in step S420 in FIG. 11 is No. The process examples in FIGS. 9 to 13 differ from the process example described above with reference to FIG. 3 in further determining the row of reference colors that corresponds to the row on which colorimetry is performed. That is, in the colorimetry system 10 according to the present embodiment, if the colors of the row on which colorimetry is performed do not correspond to the colors of the row expected for colorimetry, the comparison processing unit 19 determines the row for colorimetry that corresponds to the row on which colorimetry is performed. In such a manner, when it is determined that the row including the color chart or the like on which colorimetry has been performed is not the correct row, the user may ascertain the row on which the colorimetry has been accidentally performed.

Specifically, if the predetermined determination criteria are not satisfied (No in step S420), for example, the comparison processing unit 19 compares the color values of a row on which colorimetry is performed with the color values of M rows before and after the row expected for colorimetry (step S430). Then, the comparison processing unit 19 determines whether a row that satisfies the predetermined determination criteria is present (step S440). Herein, M is a natural number, the greatest of which is obtained by subtracting the number of rows of reference colors by one. M is desirably an even number but may be an odd number. Specifically, for example, when M=2 and the user tries to perform colorimetry on the color chart in the third row, it is assumed that the predetermined determination criteria are not satisfied. At this point, the comparison processing unit 19 compares the reference colors in two rows before and after the third row, that is, the reference colors in the second row and the reference colors in the fourth row, with the color chart or the like in the row on which colorimetry has been performed by the user.

When, for example, M=2 and the user tries to perform colorimetry on the color chart or the like in the first row but the predetermined determination criteria are not satisfied, there is no row before the first row and therefore the comparison processing unit 19 compares the reference colors in the second row with the color chart or the like in the row on which colorimetry has been performed by the user. Alternatively, in this case, the comparison processing unit 19 may compare the reference colors in two rows after the first row, that is, the reference colors in the second row and the reference colors in the third row, with the color chart or the like in the row on which colorimetry has been performed by the user.

As described above, to determine the row for colorimetry that corresponds to the row on which colorimetry is performed, the comparison processing unit 19 compares the colors of the M rows before and after the row expected for colorimetry with the color of the row on which colorimetry is performed. In such a manner, when it is determined that the row including the color chart or the like on which colorimetry has been performed is not the correct row, the row on which the colorimetry has been accidentally performed may be searched for by using the row including the color chart or the like corresponding to the row expected for colorimetry.

If the predetermined determination criteria are satisfied between the color chart or the like in the row on which colorimetry is performed and the reference colors of any one of the M rows before and after the row expected for colorimetry (Yes in step S440), the comparison processing unit 19 performs a message determination process (step S450) described below with reference to FIG. 12 and terminates the flow. Specifically, for example, in the example described above, if the predetermined determination criteria are satisfied between the color chart or the like in the row on which colorimetry has been performed by the user and the reference colors in the fourth row, the comparison processing unit 19 performs a process for displaying a message to the effect that the colorimetry on the color chart of the fourth row is performed, the details of which will be described below with reference to FIG. 12.

However, if the predetermined determination criteria are not satisfied between the color chart or the like in the row on which colorimetry is performed and the reference colors of all of the M rows before and after the row expected for colorimetry (No in step S440), the comparison processing unit 19 issues an error message command (step S470) and terminates the flow. Thereby, for example, the comparison processing unit 19 transmits the error message command to the display processing unit 20, and the display processing unit 20 displays an error message screen 86 described below with reference to FIG. 23. Note that, in the present embodiment, it is assumed that there are no cases where, as a result of step S430, the reference colors of two or more rows satisfy the predetermined determination criteria. Alternatively, when, as a result of step S430, two or more rows the reference colors of which satisfy the predetermined determination criteria are present, No may be determined in step S440 and an error message command may be issued (step S470).

Figure 12:
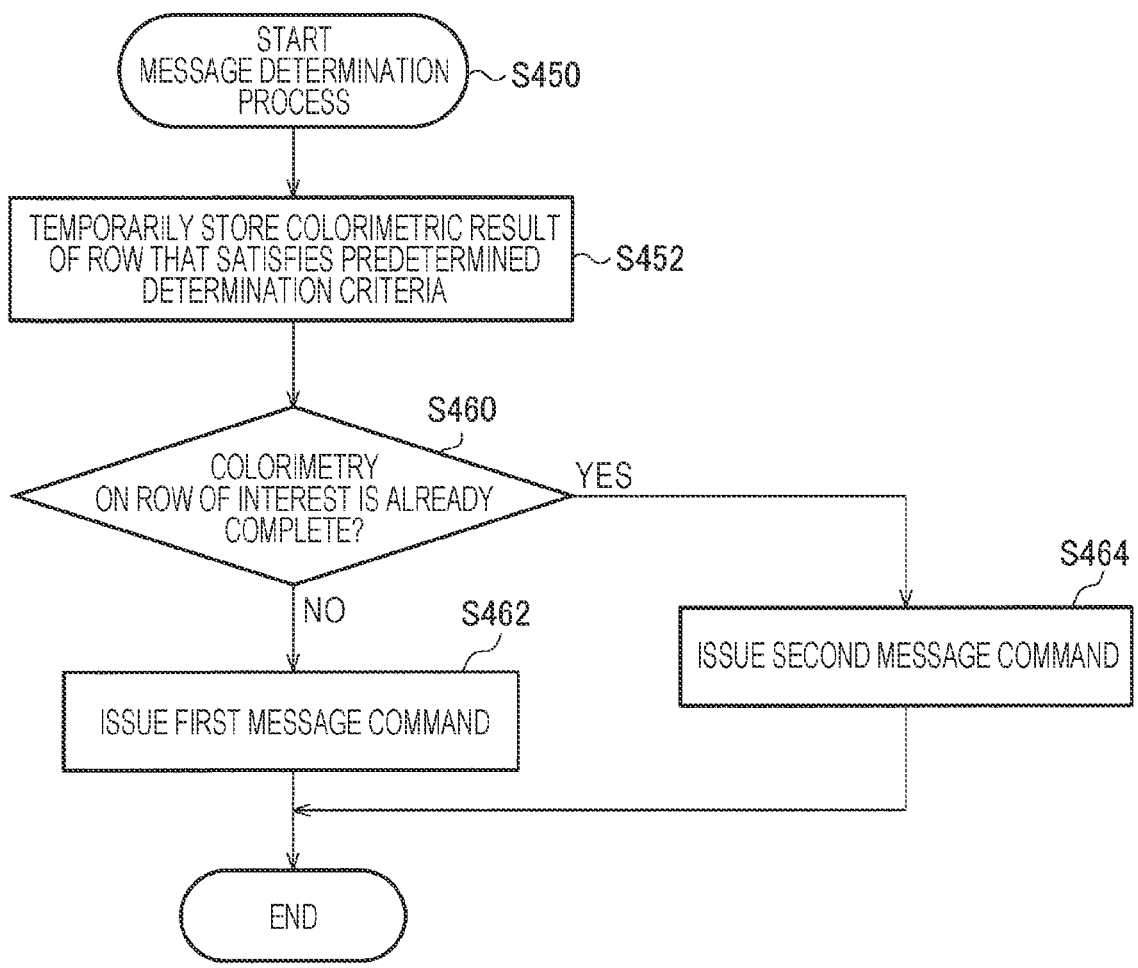
FIG. 12 is a flowchart illustrating a process example of a message determination process.

FIG. 12 is a flowchart illustrating a process example of the message determination process (step S450). The comparison processing unit 19 temporarily stores a colorimetric result of a row that satisfies the predetermined determination criteria, which is determined in step S440 in FIG. 11 (step S452). Specifically, for example, in the case where the predetermined determination criteria are satisfied between the color chart or the like in a row on which colorimetry has been accidentally performed by the user and the reference colors in the fourth row, the comparison processing unit 19 regards the colorimetry accidentally performed as colorimetry on the color chart or the like in the fourth row and temporarily stores a colorimetric result in step S452. Then, the comparison processing unit 19 determines whether colorimetry is already complete on the row of interest (step S460). The row of interest as used herein refers to a row of the color chart or the like or the reference colors involved in the colorimetric result temporarily stored in step S452, and refers to the fourth row in the example described above. For example, the comparison processing unit 19 determines whether the row of reference colors that is determined to satisfy the predetermined determination criteria (in step S440) is a row for which colorimetry is already complete. For example, the comparison processing unit 19 may perform step S460 by determining whether a colorimetry completion flag corresponding to the row that is determined to satisfy the predetermined determination criteria (in step S440) is on. In the example described above, the comparison processing unit 19 determines whether the colorimetry completion flag corresponding to the reference colors in the fourth row is on.

Then, if colorimetry on the row of interest is not already complete (No in step S460), the comparison processing unit 19 issues a first message command (step S462) and terminates the flow. However, if colorimetry on the row of interest is already complete (Yes in step S460), the comparison processing unit 19 issues a second message command (step S464) and terminates the flow. Thereby, for example, the comparison processing unit 19 transmits the first message command to the display processing unit 20, and the display processing unit 20 displays a first message screen 82 described below with reference to FIG. 18 on the display 68. Similarly, for example, the comparison processing unit 19 transmits the second message command to the display processing unit 20, and the display processing unit 20 displays a second message screen 84 described below with reference to FIG. 21 on the display 68. That is, the first message screen 82 is, of the message screen 80, a screen displayed when the row including the color chart on which colorimetry has been accidentally performed is not a row on which colorimetry is already complete, and the second message screen 84 is, of the message screen 80, a screen displayed when the row including the color chart on which colorimetry has been accidentally performed matches a row on which colorimetry is already complete.

Figure 13:
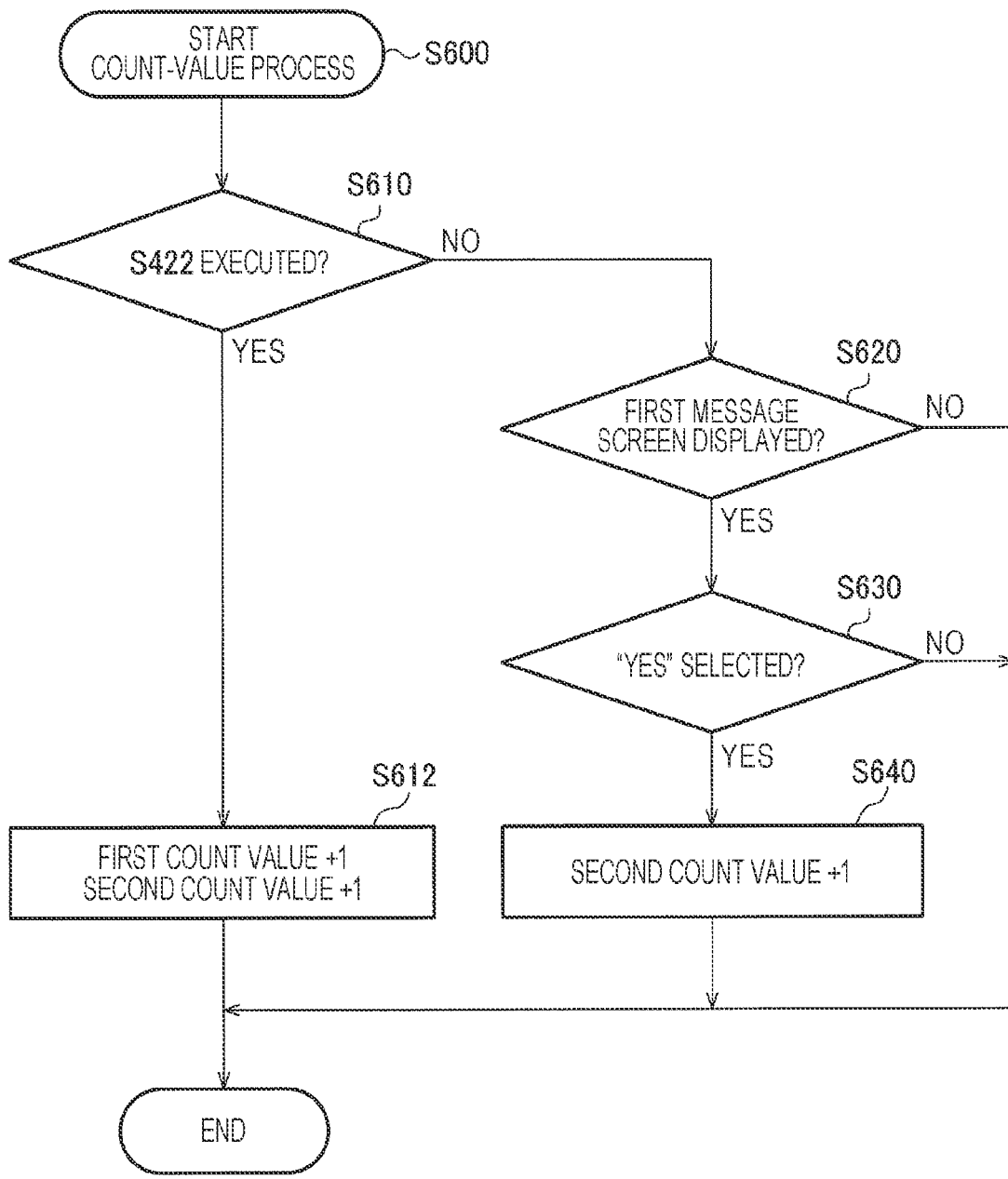
FIG. 13 is a flowchart illustrating a process example of a count-value process.

FIG. 13 is a flowchart illustrating a process example of the count-value process (step S600). The comparison processing unit 19 determines whether step S422 illustrated in FIG. 11 is executed (step S610). If step S422 is executed (Yes in step S610), the comparison processing unit 19 increments the first count value by one and increments the second count value by one (step S612) and terminates the flow. In addition, although not illustrated in the figures, the comparison processing unit 19 turns on a colorimetry completion flag corresponding to the reference colors related to step S422. Herein, the second count value refers to a value representing the number of rows on which colorimetry is already complete. In other words, the second count value is equal to the number of colorimetry completion flags that are on. For example, the colorimetry system 10 may ascertain the number of rows each including the color chart or the like on which line colorimetry is complete by monitoring the second count value.

However, if step S422 is not executed (No in step S610), the comparison processing unit 19 determines whether the first message screen 82 is displayed (step S620). Specifically, for example, the comparison processing unit 19 determines whether the first message command is issued in step S462 in FIG. 12. If the comparison processing unit 19 determines that the first message screen 82 is not displayed (No in step S620), the comparison processing unit 19 terminates the flow. In addition, if the comparison processing unit 19 determines that the first message screen 82 is displayed (Yes in step S620), the comparison processing unit 19 determines whether the user selects the "Yes" icon on the first message screen 82 (step S630).

Note that in the case where, in steps S610 and S620, the second message screen 84 and the error message screen 86 that are described below are displayed, neither the first count value nor the second count value is incremented. This is because the case where the second message screen 84 is displayed is, as described above, the case where a row including the color chart or the like on which colorimetry has been accidentally performed matches a row on which colorimetry is already complete, and is neither the case where colorimetry is performed on the color chart corresponding to the row expected for colorimetry nor the case where colorimetry is performed on a row including the color chart on which colorimetry is not already complete. A similar reason applies to the case where the error message screen 86 is displayed.

If the user selects the "Yes" icon on the first message screen 82 (Yes in step S630), the comparison processing unit 19 increments the second count value by one (step S640) and terminates the flow. Although not illustrated in the figures, the comparison processing unit 19 performs step S640, as well as officially storing a colorimetric result temporarily stored in step S452 as a new colorimetric result and turning on a colorimetry completion flag corresponding to reference colors involved in the colorimetric result. However, if the user selects the "No" icon on the first message screen 82 (No in step S630), the comparison processing unit 19 terminates the flow. Although not illustrated in the figures, if the determination result in step S630 is No, the comparison processing unit 19 discards the colorimetric result temporarily stored in step S452.

If the user selects the "Yes" icon on the first message screen 82 (Yes in step S630), the first count value is not incremented. This is because the case where the first message screen 82 is displayed is, as described above, the case where the row including the color chart on which colorimetry has been accidentally performed is a row on which colorimetry is not yet performed, and no change will occur in a row including the color chart or the like on which colorimetry is to be next performed.

Figure 14:
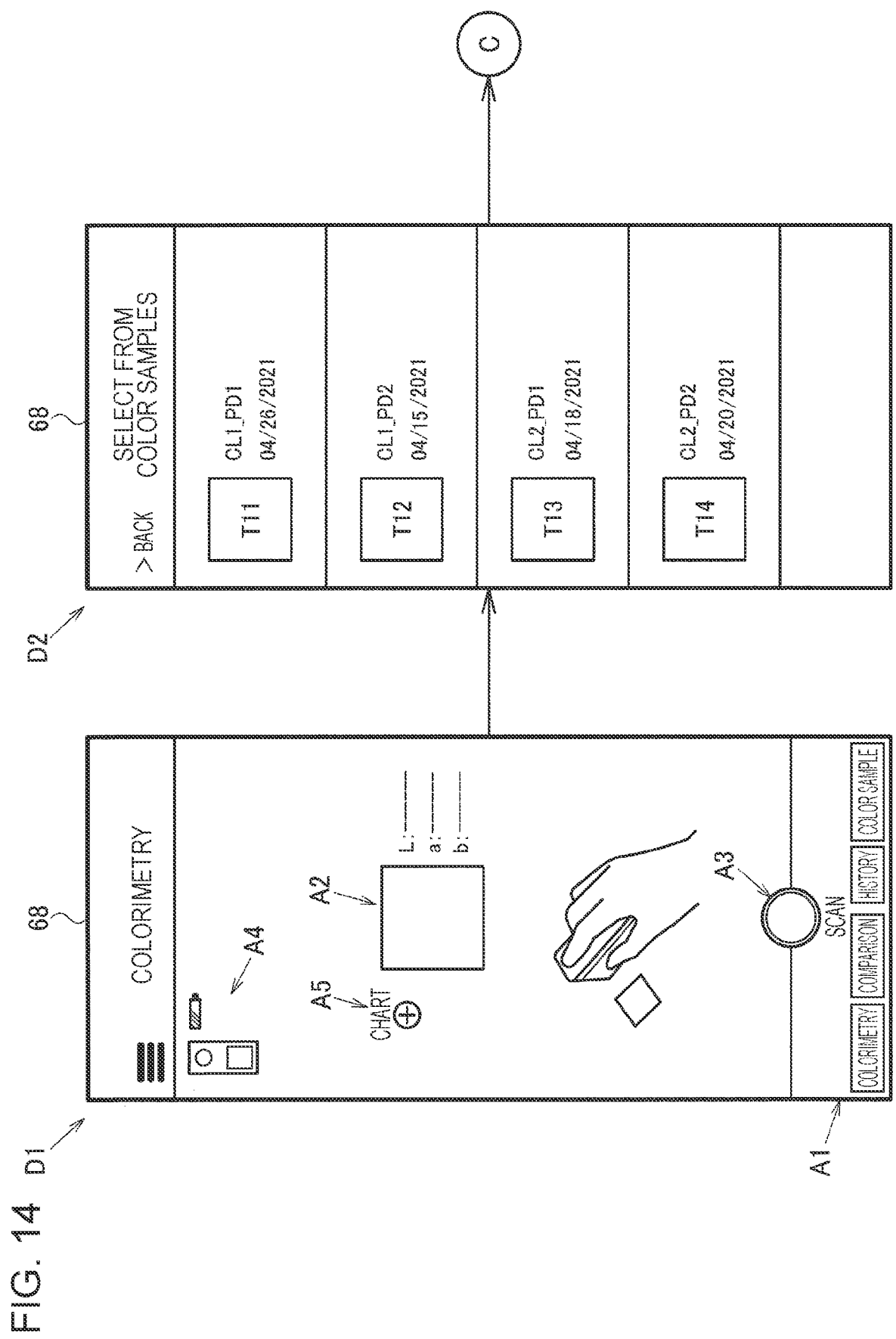
FIG. 14 is a diagram illustrating an example of screen transitions of the line colorimetry in the terminal device.
Figure 15:
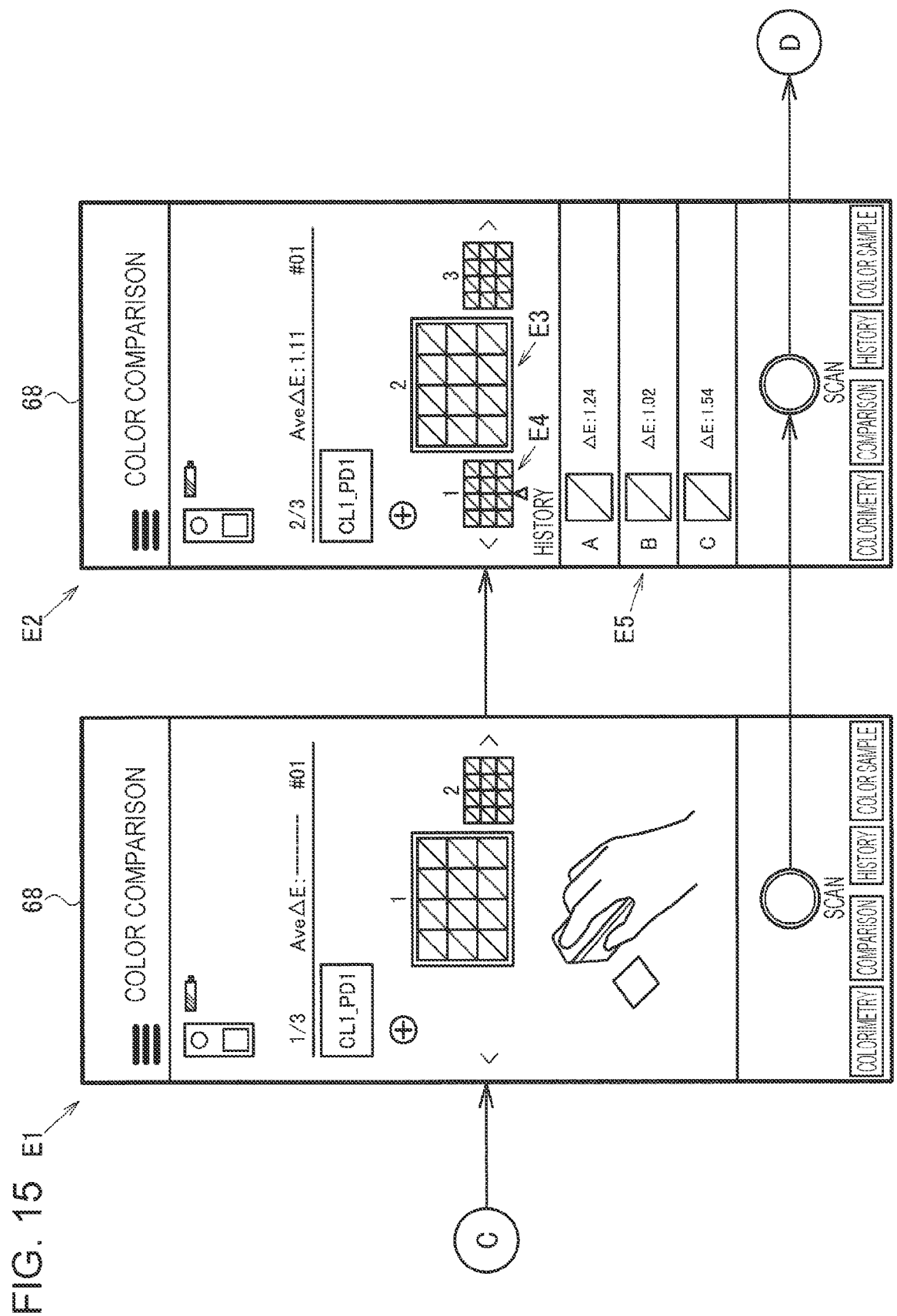
FIG. 15 is another diagram illustrating an example of screen transitions of the line colorimetry in the terminal device.
Figure 16:
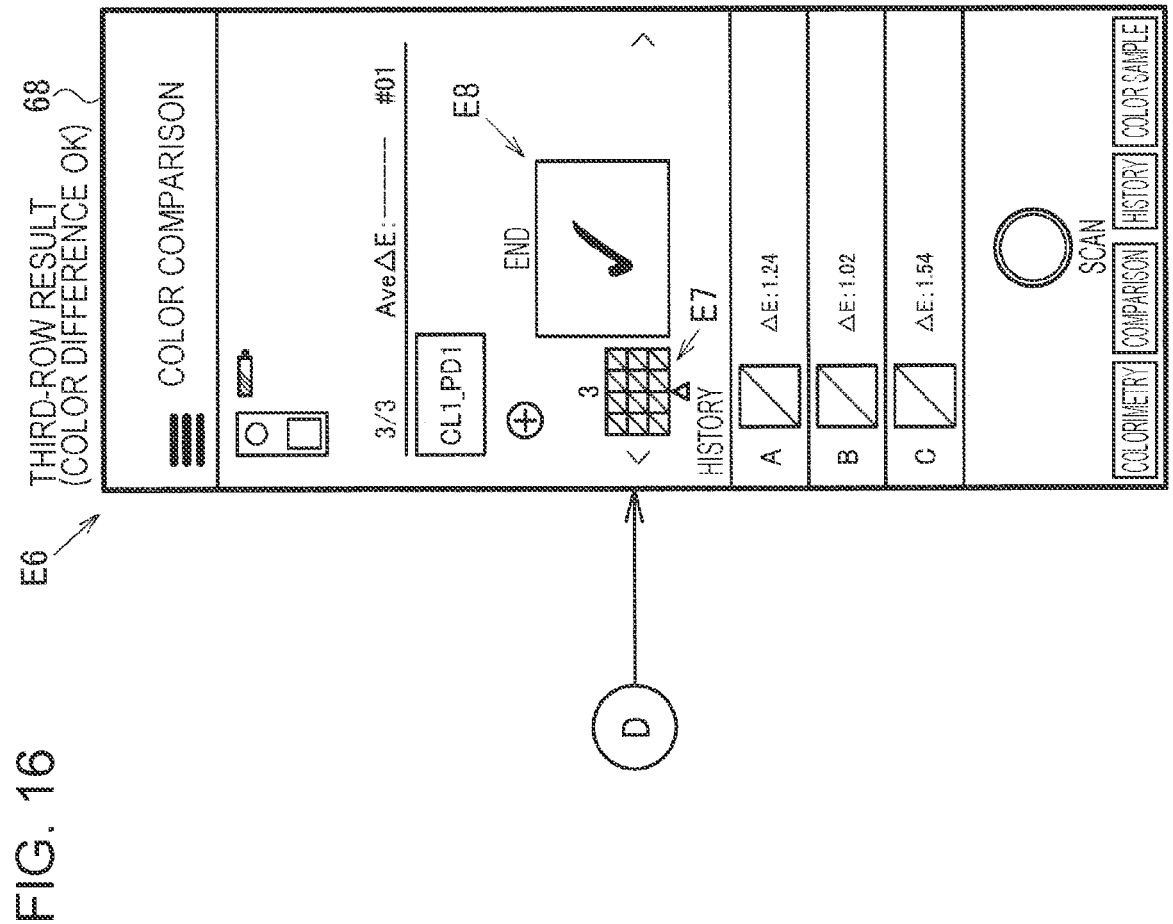
FIG. 16 is another diagram illustrating an example of screen transitions of the line colorimetry in the terminal device.

Next, using screenshots depicted in FIGS. 14, 15 and 16, the basic flow of the line colorimetry in the terminal device 60 will be described. FIGS. 14 to 16 depict examples in which each row of the color chart on which colorimetry has been performed by the user is the correct row, and an example in which the techniques of the present embodiment are desired will be described with reference to FIG. 17 and the subsequent figures.

When the user starts the predetermined application program in the terminal device 60, the processing unit 62 displays a screen indicated by D1 in FIG. 14 on the display 68. On the screen of D1, for example, when the user selects icons of the "colorimetry", "comparison", "history", and "color sample" indicated by A1, the screen shifts to a colorimetric result screen, a color comparison screen, a history screen of colors obtained by colorimetry in the past, and a selection screen for a color sample book, respectively. Selection of an icon or the like on the display 68 is implemented by a touch operation on the display 68, which is a touch panel. On the screen indicated by D1, the user has not performed a colorimetric operation yet, and therefore a colorimetric result as indicated by A2 is not displayed. When the user wants to perform a colorimetric operation, the user performs an operation of selecting the icon of a colorimetry button indicated by A3 but may depress the colorimetry button 40 of the colorimeter 30. As indicated by A4, the status information, such as the residual amount of a battery, of the colorimeter 30 is displayed on the screen.

When the user selects a button icon indicated by A5, the screen of D1 transitions to a screen indicated by D2. On the screen of D2, color groups created by the user are each displayed as a bar icon. On the bar icon of each color group, the name of the color group, the creation date and time of the color group, and a predetermined thumbnail image may be displayed and superimposed. Such a way enables the user to rapidly selects a color group.

When, on the screen of D2, the user selects a color group with, for example, a color group name "CL1_PD1", the screen of D2 transitions to a screen indicated by E1 in FIG. 15. On the screen of E1, the name "CL1_PD1" of the selected color group may be displayed. This enables the user to recognize which color group is used while colorimetry is being performed. When colorimetry is performed after the screen of E1 has been displayed on the display 68, colorimetry on the color chart or the like in the first row is performed, and a screen as indicated by E2 is displayed as a result of the colorimetry on the display 68. On the screen of E2, as indicated by E3, reference colors involved in the row expected for colorimetry and a rectangular first marker for identifying the row expected for colorimetry are displayed at the center of the screen. In addition, colors indicating the overview of reference colors corresponding to a row next to the row expected for colorimetry are displayed on the right of the screen. In addition, as indicated by E4, a colorimetric result, which is involved in the row on which colorimetry is performed this time, and a second marker, which is a triangle arrow for identifying the colorimetric result, are displayed on the left of the screen. In addition, as indicated by E5, the respective colorimetric results of colors obtained by colorimetry are also displayed.

Upon performing similar operations to perform colorimetry on the color chart or the like in the third row, a screen as indicated by E6 in FIG. 16 is displayed on the display 68. On the screen of E6, as indicated by E7, a colorimetric result of the color chart or the like in the final, third row is displayed on the left of the screen, which indicates that colorimetry has been performed. In addition, as indicated by E8, an end icon indicating that the next color group on which colorimetry is to be performed is absent is displayed at the center of the screen. Thereafter, a predetermined trigger causes the screen of E6 to transition to a screen displaying an operation result, as indicated by E9. The predetermined trigger means that, for example, the user selects an end icon, a predetermined time period has passed, or the like. On the screen of E9, as indicated by E10, it is displayed that the number of cases of NG is zero and, as indicated by E11, for example, the average color difference Ave ΔE for all the lines is displayed. In addition, as indicated by E12, the color difference ΔE and the overview color for each of colors in each row are displayed.

The colorimetric result of each line is displayed as a square group. The square group is such that square-shaped images, each of which is divided into two equal parts by one diagonal line, are arranged according to a predetermined rule. The predetermined rule as used herein is, for example, to arrange 12 square-shaped images such that three square-shaped images are aligned in the vertical direction and four square-shaped images are aligned in the horizontal direction. Although not illustrated in detail in the figures, before colorimetry, the square group is displayed such that one of the divided areas is filled based on the reference color. In addition, after colorimetry, the square group is displayed such that the other of the divided areas is filled based on the color obtained by colorimetry. For example, on the screen of E1, both of the square groups regarding the colorimetric results in the first row and in the second row are before colorimetry and therefore one of the divided areas is filled with the reference color.

Similarly, on the screen of E2, the square group regarding a colorimetric result in the first row as indicated by E4 is after colorimetry and therefore is displayed such that one of the areas is filled with the reference color and the other area is filled in accordance with the color obtained by colorimetry. In addition, both of the square groups regarding the colorimetric results in the second row and in the third row are before colorimetry and therefore is displayed such that one of the areas is filled with the reference color. Similarly, on the screen of E6, the square group regarding a colorimetric result in the third row is after colorimetry and therefore is displayed such that one of the areas is filled based on the reference color and the other area is filled based on the color obtained by colorimetry.

Figure 17:
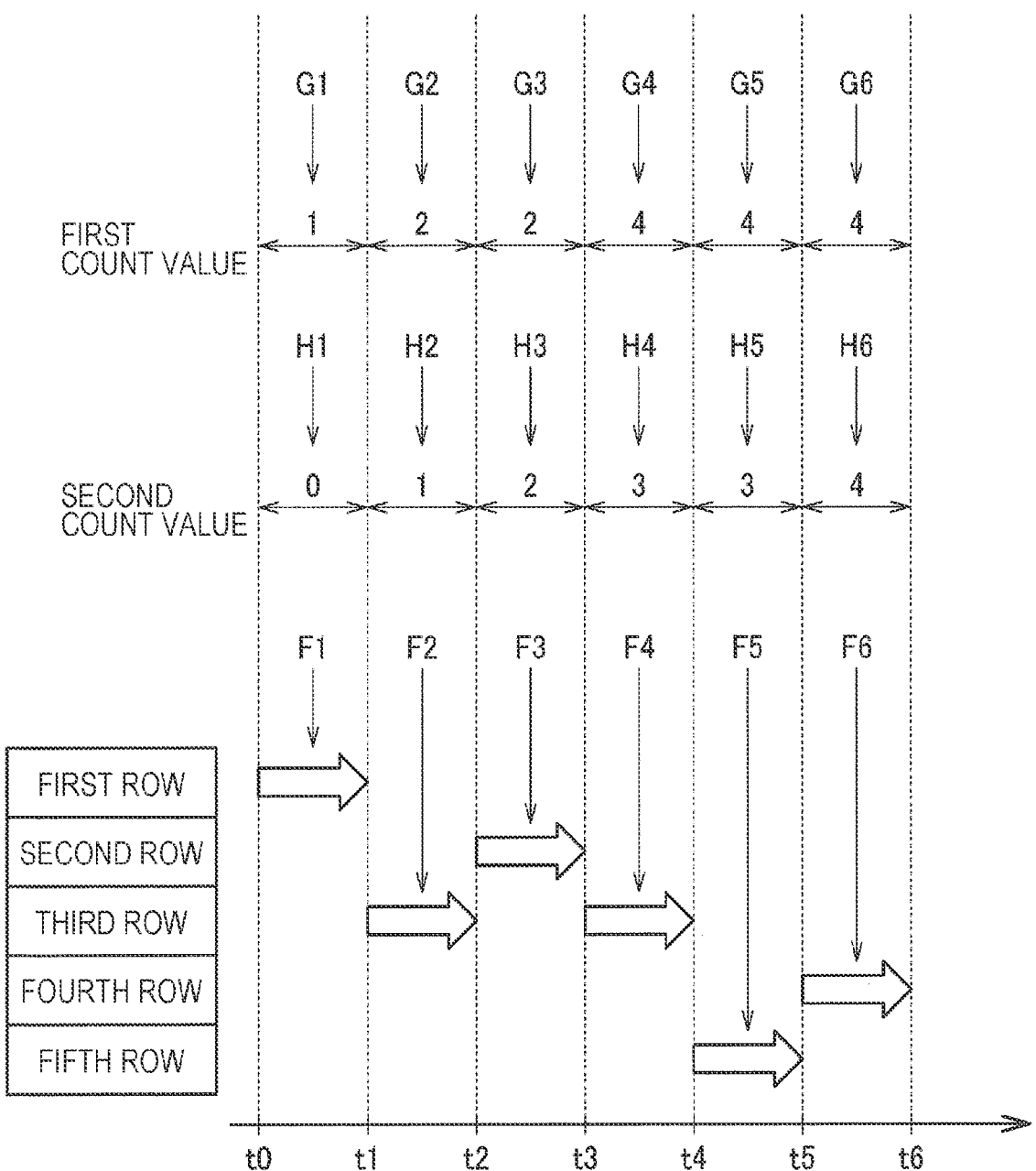
FIG. 17 is a diagram illustrating a specific example of line colorimetry including wrong colorimetry work.

Next, with reference to FIG. 17, FIG. 18, FIG. 19, FIG. 20, FIG. 21, and FIG. 22, an example of line colorimetry including the case where the user has accidentally performed colorimetry on a row including the color chart on which colorimetry is to be performed. FIG. 17 is a diagram illustrating, by way of example, the flow of line colorimetry performed on five rows of the color chart by the user. FIGS. 18 to 22 are diagrams illustrating screenshots displayed when the techniques of the present embodiment are applied to the flow of line colorimetry illustrated in FIG. 17. In the program of line colorimetry in FIG. 17, M in step S430 in FIG. 11 is assumed to be set to two. In addition, hereafter, description of overlapping processing may be omitted as appropriate.

In FIG. 17, it is assumed that, at a timing to, the user starts the program for line colorimetry of the colorimetry system 10. This results in Yes in step S210 in FIG. 10, and, in steps S212 and S240, the first count value is set to one as indicated by G1 in FIG. 17. In addition, the color chart of a row on which colorimetry has been performed is not present yet, and therefore all the colorimetry completion flags are off and the second count value is set to zero. Then, as a result of step S300, as displayed on the screen of E1 in FIG. 15, the reference colors in the first row are displayed at the center of the screen.

It is then assumed that, as indicated by F1 in FIG. 17, line colorimetry on the color chart in the first row is performed by the user, and at a timing t1, the line colorimetry is finished. The comparison processing unit 19 compares the color chart in the first row with the reference colors in the first row, and therefore the result of the determination in step S420 in FIG. 11 is Yes and, through step S422, the result of the determination in step S610 in FIG. 13 is Yes. In step S612, the comparison processing unit 19 sets the first count value from one to two and sets the second count value from zero to one, and turns on a colorimetry completion flag corresponding to the reference colors in the first row. Thereby, colorimetry on the color chart in the first row is already complete.

Then, step S100 and the subsequent steps are performed again. Since colorimetry on the color chart in all the rows is not complete, step S100 is No and the row-expected-for-colorimetry determination process (step S200) is performed again. The line colorimetry at the timing t1 is not the line colorimetry performed for the first time and thus the result of the determination in step S210 in FIG. 10 is No. Then, the comparison processing unit 19 performs step S220 since the first count value is two. In addition, colorimetry on the color chart in the second row is not yet performed and a colorimetry completion flag corresponding to the reference colors in the second row is off, and therefore the comparison processing unit 19 determines No in step S220. Thereby, in step S240, the colorimetry system 10 sets the reference colors in the second row as a row expected for colorimetry.

It is then assumed that, as indicated by F2 in FIG. 17, although line colorimetry on the color chart in the second row is originally to be performed, line colorimetry on the color chart in the third row is accidentally performed by the user and, at a timing t2, the line colorimetry is finished. In this case, in step S420 in FIG. 11, the result of the determination is No, and thus the comparison processing unit 19 performs step S430. That is, the comparison processing unit 19 determines whether the predetermined determination criteria are satisfied between the reference colors in two rows adjacent to, before and after, the second row of the reference colors, the second row being the row expected for colorimetry, and the color chart in the third row on which colorimetry has been accidentally performed. Since M=2 as mentioned above, the comparison processing unit 19 determines that the predetermined determination criteria are satisfied between the reference colors in the third row located one row adjacent to the second row of the reference colors, the second row being the row expected for colorimetry, and the color chart in the third row on which colorimetry has been accidentally performed. Accordingly, the comparison processing unit 19 determines Yes in step S440 and performs the message determination process (step S450). Then, in the message determination process (step S450) in FIG. 12, the comparison processing unit 19 temporarily stores a colorimetric result obtained by colorimetry accidentally performed in step S452. In addition, the color chart in the third row, which is the row on which colorimetry has been accidentally performed, is not a row on which colorimetry is already complete, and therefore the comparison processing unit 19 determines No in step S460 and issues the first message command (step S462).

Figure 18:
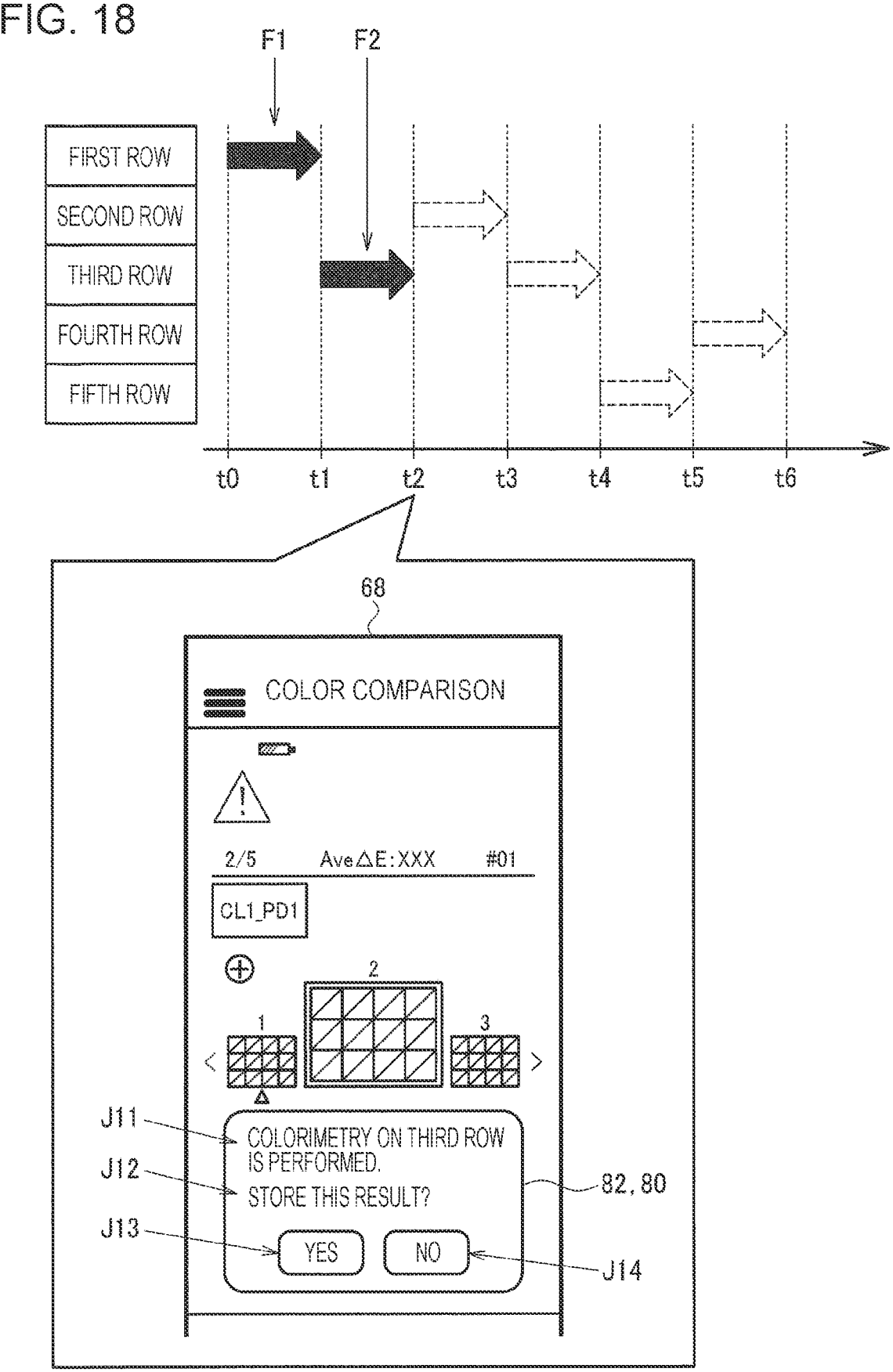
FIG. 18 is a diagram illustrating an example of a screenshot to which the techniques of the present embodiment are applied.

Thereby, as illustrated in FIG. 18, at the timing t2, the display processing unit 20 displays the first message screen 82. On the first message screen 82, a message, indicated by J11, indicating the row including the color chart on which colorimetry has been performed is displayed. In addition, on the first message screen 82, a message, indicated by J12, asking whether to newly store a colorimetric result obtained by line colorimetry that has been accidentally performed, a "Yes" icon, indicated by J13, and a "No" icon, indicated by J14, are displayed. In such a manner, in the colorimetry system 10 according to the present embodiment, when the comparison processing unit 19 determines that the colors of the row on which colorimetry has been performed do not correspond to the colors of the row expected for colorimetry and that a row for colorimetry corresponding to the row on which colorimetry has been performed is present, the display processing unit 20 performs a display process of asking the user whether to newly store data on the colors of the row on which colorimetry has been performed. Such a manner enables the user to verify whether to newly store a colorimetric result of a row including the color chart or the like on which colorimetry has been accidentally performed.

Figure 19:
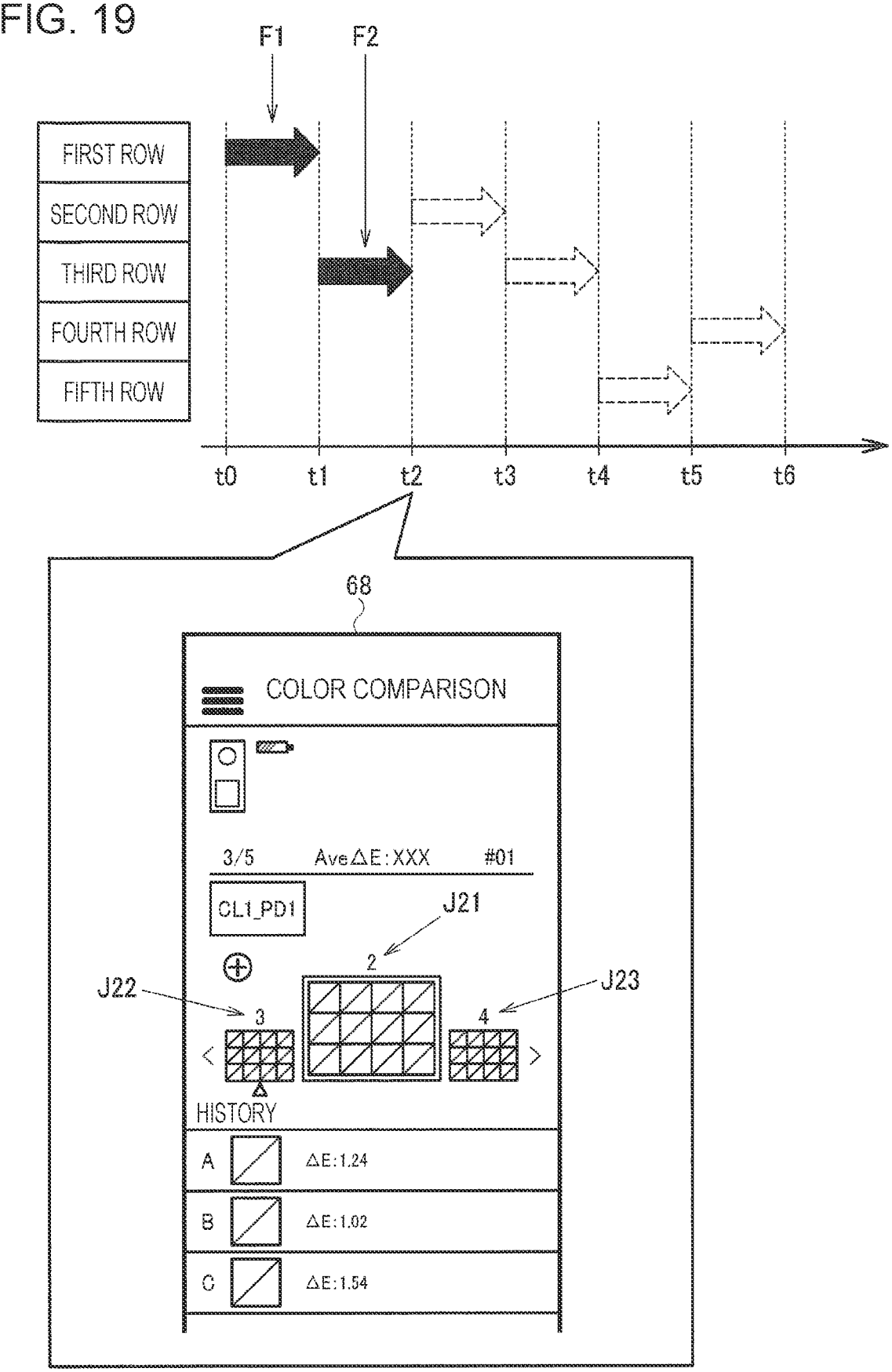
FIG. 19 is another diagram illustrating an example of a screenshot to which the techniques of the present embodiment are applied.
Figure 20:
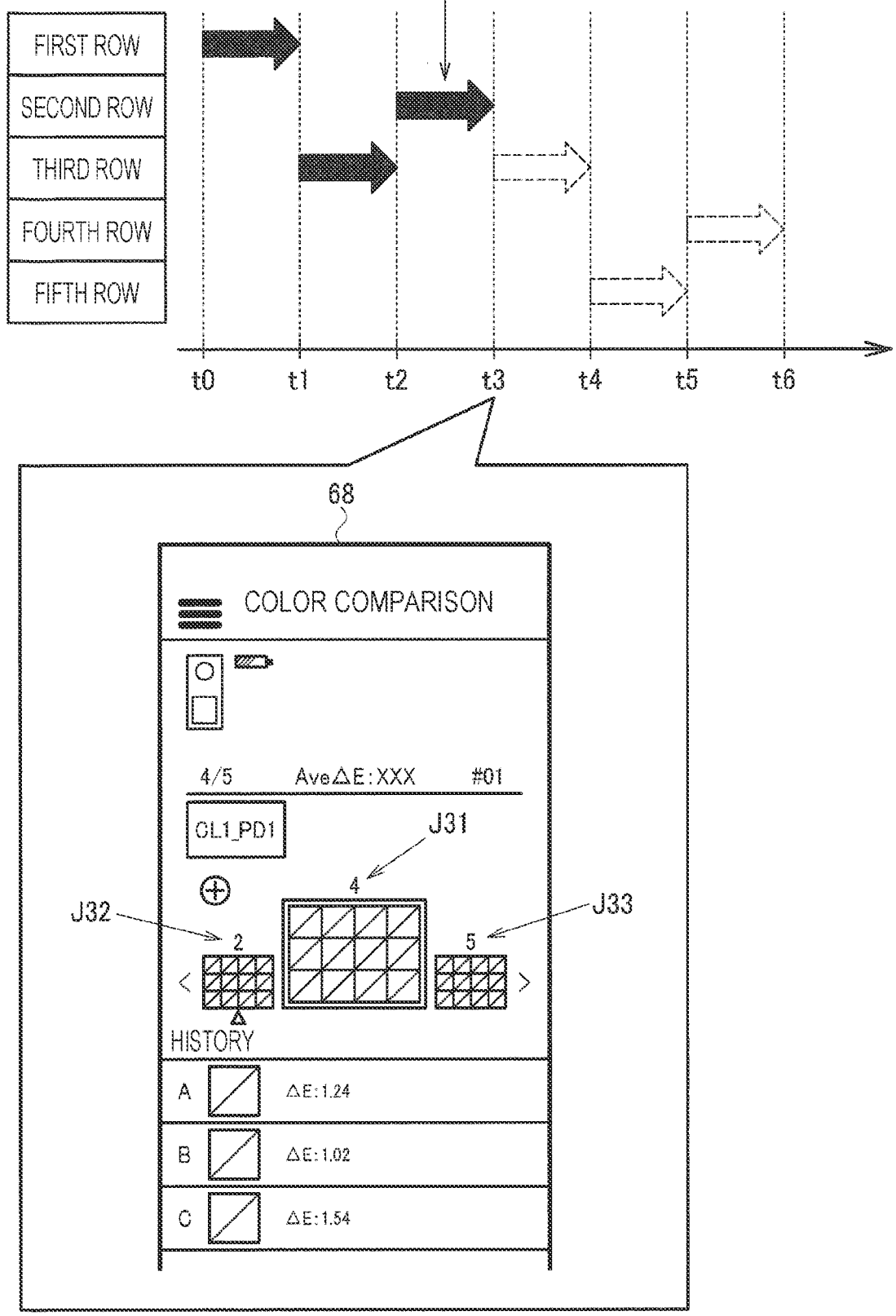
FIG. 20 is another diagram illustrating an example of a screenshot to which the techniques of the present embodiment are applied.

Then, at the timing t2, it is assumed that the user selects the "Yes" icon indicated by J13. In this case, the comparison processing unit 19 determines Yes in step S630 in FIG. 13, officially stores the colorimetric result temporarily stored in step S452, as a colorimetric result using reference colors in the third row, sets the second count value from one to two in step S640, and turns on a colorimetry completion flag corresponding to the reference colors in the third row. Then, in step S100 in FIG. 9 performed again, the result of the determination is No, which is the same as described above, and the row-expected-for-colorimetry determination process (step S200) is performed. In the row-expected-for-colorimetry determination process (step S200) in FIG. 10, the result of the determination in step S210 is No, which is the same as described above, and the process proceeds to step S220. Here, since the first count value is maintained to be two, the comparison processing unit 19 determines whether a colorimetry completion flag corresponding to the reference color in the second row is on. Colorimetry on the color chart in the second row is not yet performed and the colorimetry completion flag corresponding to the reference colors in the second row is off, and therefore the comparison processing unit 19 determines No in step S220. Thereby, in step S240, the comparison processing unit 19 determines the reference colors in the second row as a row expected for colorimetry. From the above, as indicated by H2 and H3 in FIG. 17, the second count value changes from one to two between before and after the timing t2. In contrast, as indicated by G2 and G3 in FIG. 17, the first count value remains at two before and after the timing t2. Thereby, as illustrated in FIG. 19, at the timing t2, the reference colors in the second row are displayed as a row expected for colorimetry as indicated by J21 at the center of the screen. From the above, when data on the colors of a row on which colorimetry has been performed is stored, the display processing unit 20 sets a row completion flag of a row regarding the stored data on the colors, as a row on which colorimetry is already complete, for example, by turning on the colorimetry completion flag, and performs a display process of displaying, as a row expected for colorimetry, a row on which colorimetry is not yet performed that is determined in step S220, step S240, and so on described above. Such a way enables the user to easily ascertain a row including the color chart on which colorimetry is not yet performed in line colorimetry. As indicated by J22, the display processing unit 20 may display a colorimetric result based on reference colors corresponding to the color chart in the third row and the second marker on the left of the screen. In addition, since colorimetry on the color chart in the third row is already complete, for example, as indicated by J23, the display processing unit 20 may display the reference colors in the fourth row, as the next row expected for colorimetry, on the right of the screen.

It is then assumed that, as indicated by F3 in FIG. 17, line colorimetry is performed, by the user, on the color chart in the second row on which colorimetry has not been yet performed, and, at a timing t3, the line colorimetry is finished. In this case, the result of the determination in step S420 in FIG. 11 is Yes, the process passes through step S422, and the result of the determination in step S610 in FIG. 13 is Yes, and therefore, in step S612, the comparison processing unit 19 sets the first count value from two to three and sets the second count value from two to three, and turns on the colorimetry completion flag corresponding to the reference colors in the second row. Then, in step S100 in FIG. 9 performed again, the result of the determination is No, which is the same as described above, and the row-expected-for-colorimetry determination process (step S200) is performed. In the row-expected-for-colorimetry determination process (step S200) in FIG. 10, the result of the determination in step S210 is No, which is the same as described above, and the process proceeds to step S220. Here, since the first count value is three, the comparison processing unit 19 determines whether a colorimetry completion flag corresponding to the reference colors in the third row is on. Since the colorimetry completion flag corresponding to the reference colors in the third row is on as described with reference to FIG. 18, the result of the determination in step S220 is Yes. In addition, since the greatest of the first count value is five in the line colorimetry in FIG. 17, the comparison processing unit 19 determines No in step S230, sets the first count value from three to four in step S232, and performs step S220 again. Then, in step S220 performed again, since the first count value is four, the comparison processing unit 19 determines whether a colorimetry completion flag corresponding to the reference colors in the fourth row is on. Colorimetry on the color chart in the fourth row is not yet performed and a colorimetry completion flag corresponding to the reference colors in the fourth row is off, and therefore the comparison processing unit 19 determines No in step S220. Thereby, in step S240, the comparison processing unit 19 determines the reference colors in the fourth row as a row expected for colorimetry. From the above, as indicated by G3 and G4 in FIG. 17, the first count value changes from two to four between before and after the timing t3. Therefore, as indicated by J31 in FIG. 20, at the timing t3, the reference colors in the fourth row are displayed at the center of the screen. As indicated by J32, the display processing unit 20 may display a colorimetric result based on reference colors corresponding to the color chart in the second row and the second marker on the left of the screen. In addition, as indicated by J33, the display processing unit 20 may display the reference colors in the fifth row, as the next row expected for colorimetry, on the right of the screen.

It is then assumed that, as indicated by F4 in FIG. 17, although colorimetry on the color chart in the fourth row is originally to be performed, line colorimetry on the color chart in the third row is accidentally performed by the user and, at a timing t4, the line colorimetry is finished. In this case, the result of the determination in step S420 in FIG. 11 is No, and thus the comparison processing unit 19 performs step S430. That is, the comparison processing unit 19 determines whether the predetermined determination criteria are satisfied between the reference colors in two rows adjacent to, before and after, the row of the reference colors in the fourth row, which is the row expected for colorimetry, and the color chart in the third row on which colorimetry has been accidentally performed. Then, the comparison processing unit 19 determines that the predetermined determination criteria are satisfied between the reference colors in the third row that is one row adjacent to the reference colors in the fourth row, which is the row expected for colorimetry, and the color values of the color chart in the third row on which colorimetry has been accidentally performed. Accordingly, the comparison processing unit 19 determines Yes in step S440 and performs the message determination process (step S450). In addition, in the message determination process (step S450) in FIG. 12, the comparison processing unit 19 temporarily stores a colorimetric result obtained by colorimetry accidentally performed in step S452. In addition, since the color chart in the third row, which is the row on which colorimetry has been accidentally performed, is a row on which colorimetry is already complete, and the colorimetry completion flag corresponding to the reference colors in the third row is on, the comparison processing unit 19 determines Yes in step S460 and issues the second message command (step S464).

Figure 21:
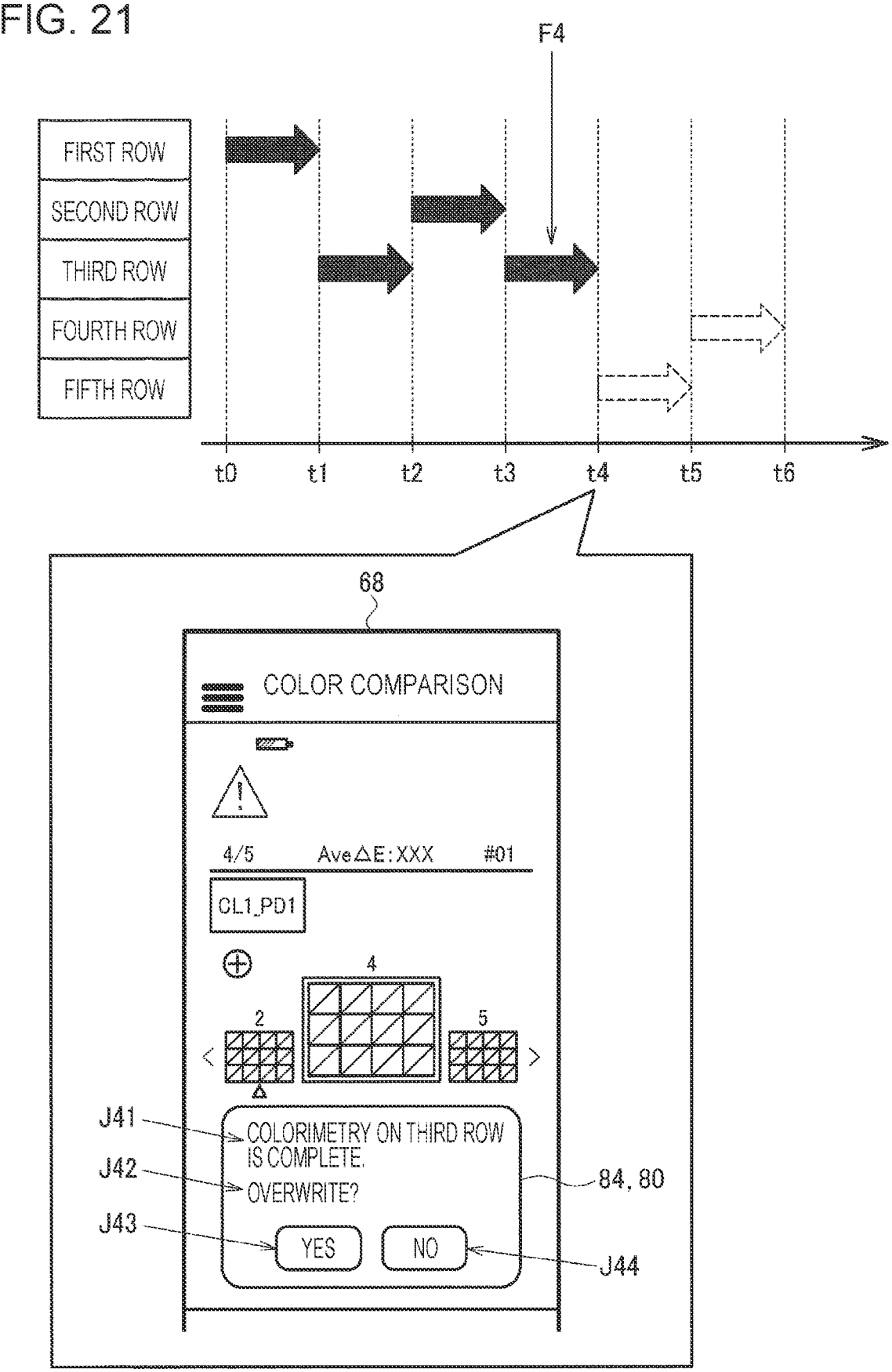
FIG. 21 is another diagram illustrating an example of a screenshot to which the techniques of the present embodiment are applied.

Thereby, as illustrated in FIG. 21, the display processing unit 20 displays the second message screen 84. On the second message screen 84, a message, indicated by J41, indicating the row including the color chart on which colorimetry has been performed is displayed. In addition, on the second message screen 84, a message, indicated by J42, asking the user whether to store a colorimetric result, which is obtained by colorimetry accidentally performed, by overwriting the existing colorimetric result, a "Yes" icon, indicated by J43, and a "No" icon, indicated by J44, are displayed. In such a manner, in the colorimetry system 10 according to the present embodiment, when the comparison processing unit 19 determines that the colors of the row on which colorimetry has been performed do not correspond to the colors of the row expected for colorimetry and that the row on which colorimetry has been performed is a row on which colorimetry is already complete, the display processing unit 20 performs a display process of displaying a message asking the user whether to store data on the colors of the row on which colorimetry has been performed, by overwriting the existing data. Such a manner enables the user to verify whether to store a colorimetric result of the color chart or the like on which colorimetry has been accidentally performed and on which colorimetry is already complete, by overwriting the existing data. Thereby, for example, when a colorimetric result obtained by the second colorimetry is more appropriate than a colorimetric result obtained by the first colorimetry, the user may store the colorimetric result obtained by the second colorimetry by overwriting the existing colorimetric result, which improves the convenience of the colorimetry system 10. Although not illustrated in the figures, when the user selects the "Yes" icon indicated by J43, the comparison processing unit 19 stores the colorimetric result temporarily stored in step S452 in FIG. 12 by overwriting a colorimetric result that has been already stored.

Even when the user selects the "Yes" icon indicated by J43, the fact that colorimetry on the color chart in the third row is already complete only remains the same, and, even when the user selects the "No" icon indicated by J44, the colorimetric result temporarily stored in step S452 in FIG. 12 is only discarded. Therefore, the first count value and the second count value remain the same as before.

Then, in step S100 in FIG. 9 performed again, the result of the determination is No, which is the same as described above, and the row-expected-for-colorimetry determination process (step S200) is performed. In the row-expected-for-colorimetry determination process (step S200) in FIG. 10, as described in the case of the timing t3, since the first count value is four and since colorimetry on the color chart in the fourth row is not yet performed and the colorimetry completion flag corresponding to the reference colors in the fourth row is off, the comparison processing unit 19 determines No in step S220. Thereby, in step S240, the comparison processing unit 19 determines the reference colors in the fourth row as a row expected for colorimetry. From the above, as indicated by G4 and G5 in FIG. 17, the first count value remains at four before and after the timing t4. Similarly, as indicated by H4 and H5, the second count value remains at three before and after the timing t4. Thereby, although not illustrated in the figures, at the timing t4, as in the case of the timing t3, for example, the reference colors corresponding to the color chart in the fourth row are displayed at the center of the screen.

It is then assumed that, as indicated by F5 in FIG. 17, although colorimetry on the color chart in the fourth row is originally to be performed, line colorimetry on the color chart in the fifth row is accidentally performed by the user and, at a timing t5, the line colorimetry is finished. In this case, as indicated by F2 mentioned above, the comparison processing unit 19 determines No in step S420 in FIG. 11 and performs step S430. That is, the comparison processing unit 19 determines whether the predetermined determination criteria are satisfied between the reference colors in two rows adjacent to, before and after, the row of the reference colors in the fourth row, which is the row expected for colorimetry, and the color chart in the fifth row on which colorimetry has been accidentally performed. Then, the comparison processing unit 19 determines that the predetermined determination criteria are satisfied between the reference colors in the fifth row that is one row adjacent to the reference colors in the fourth row, which is the row expected for colorimetry, and the color values of the color chart in the fifth row on which colorimetry has been accidentally performed. Accordingly, the comparison processing unit 19 determines Yes in step S440 and performs the message determination process (step S450). In addition, in the message determination process (step S450) in FIG. 12, the comparison processing unit 19 temporarily stores a colorimetric result obtained by colorimetry accidentally performed in step S452. In addition, since the color chart in the fifth row, which is the row on which colorimetry has been accidentally performed, is not a row on which colorimetry is already complete, and the colorimetry completion flag corresponding to the reference colors in the fifth row is off, the comparison processing unit 19 determines No in step S460 and issues the first message command (step S462). From the above, at the timing t5, as in the case of the timing t2, the display processing unit 20 displays the first message screen 82. The first message screen 82 at the timing t5 is similar to that in FIG. 18 and therefore is not illustrated in the figures.

Figure 22:
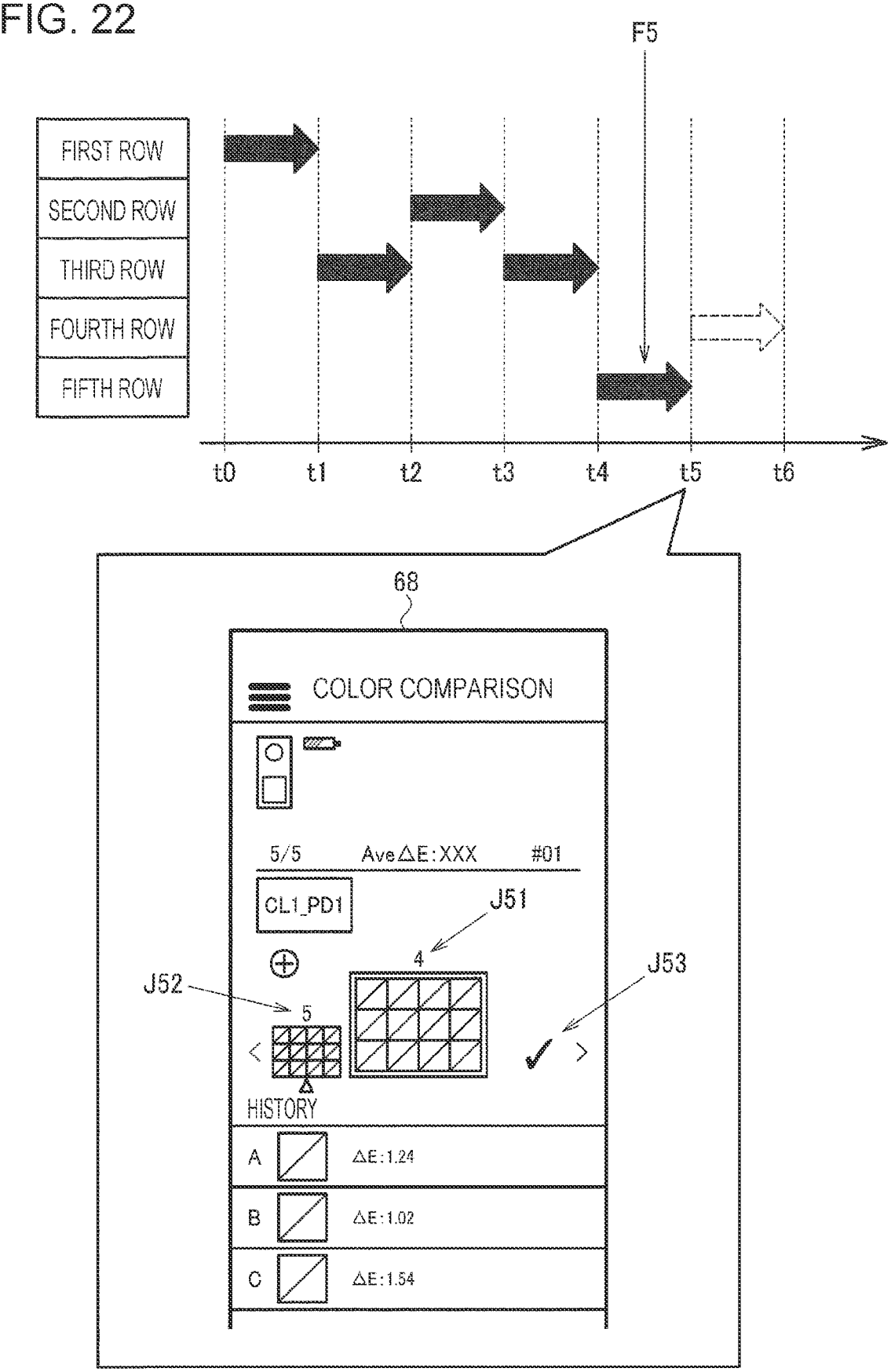
FIG. 22 is another diagram illustrating an example of a screenshot to which the techniques of the present embodiment are applied.

It is then assumed that the user selects the "Yes" icon on the first message screen 82 not illustrated in the figures. In this case, the comparison processing unit 19 determines Yes in step S630 in FIG. 13, officially stores the colorimetric result temporarily stored in step S452, as a colorimetric result using reference colors in the fifth row, increases the second count value from three to four in step S640, and turns on a colorimetry completion flag corresponding to the reference colors in the fifth row. Then, in step S100 in FIG. 9 performed again, the result of the determination is No, which is the same as described above, and the row-expected-for-colorimetry determination process (step S200) is performed. In the row-expected-for-colorimetry determination process (step S200) in FIG. 10, the result of the determination in step S210 is No, which is the same as described above, and the process proceeds to step S220. Here, since the first count value remains at four, the comparison processing unit 19 determines whether the colorimetry completion flag corresponding to the reference color in the fourth row is on. Colorimetry on the color chart in the fourth row is not yet performed and the colorimetry completion flag corresponding to the reference colors in the fourth row is off, and therefore the comparison processing unit 19 determines No in step S220. Thereby, in step S240, the comparison processing unit 19 determines the reference colors in the fourth row as a row expected for colorimetry. From the above, as indicated by H5 and H6 in FIG. 17, the second count value changes from three to four before and after the timing t5. In contrast, as indicated by G5 and G6 in FIG. 17, the first count value remains at four before and after the timing t5. Therefore, as illustrated in FIG. 22, at the timing t5, as in the cases of the timing t3 and the timing t4, the reference colors corresponding to the color chart in the fourth row are displayed at the center of the screen. Since the second count value is four obtained by subtracting one from five, the greatest value, the display processing unit 20 may display an end icon indicated by J53 on the right of the screen. Such a manner enables the user to recognize colorimetry on the final line in line colorimetry.

Then, it is assumed that, as indicated by F6 in FIG. 17, the user performs line colorimetry on the color chart in the fourth row and, at a timing t6, the line colorimetry is finished. In this case, comparison is made with the reference colors in the fourth row, which is a row expected for colorimetry. Therefore, the result of the determination in step S420 in FIG. 11 is Yes and, through step S422, the result of the determination in step S610 in FIG. 13 is Yes. Therefore, the comparison processing unit 19 sets the first count value from four to five and sets the second count value from four to five, and turns on the colorimetry completion flag corresponding to the reference colors in the fourth row. Thereby, the second count value is five, the greatest value, and therefore the colorimetry system 10 again determines Yes in step S100 in FIG. 9 and terminates the flow in FIG.

9. Thereby, the display processing unit 20 displays, for example, a screen similar to the screen indicated by E6 in FIG. 16.

In such a manner, when the techniques of the present embodiment are applied, the user may reliably accomplish colorimetry on all the lines while effectively using a colorimetric result obtained by colorimetry on a line even when colorimetry on the line has been accidentally performed.

Figure 23:
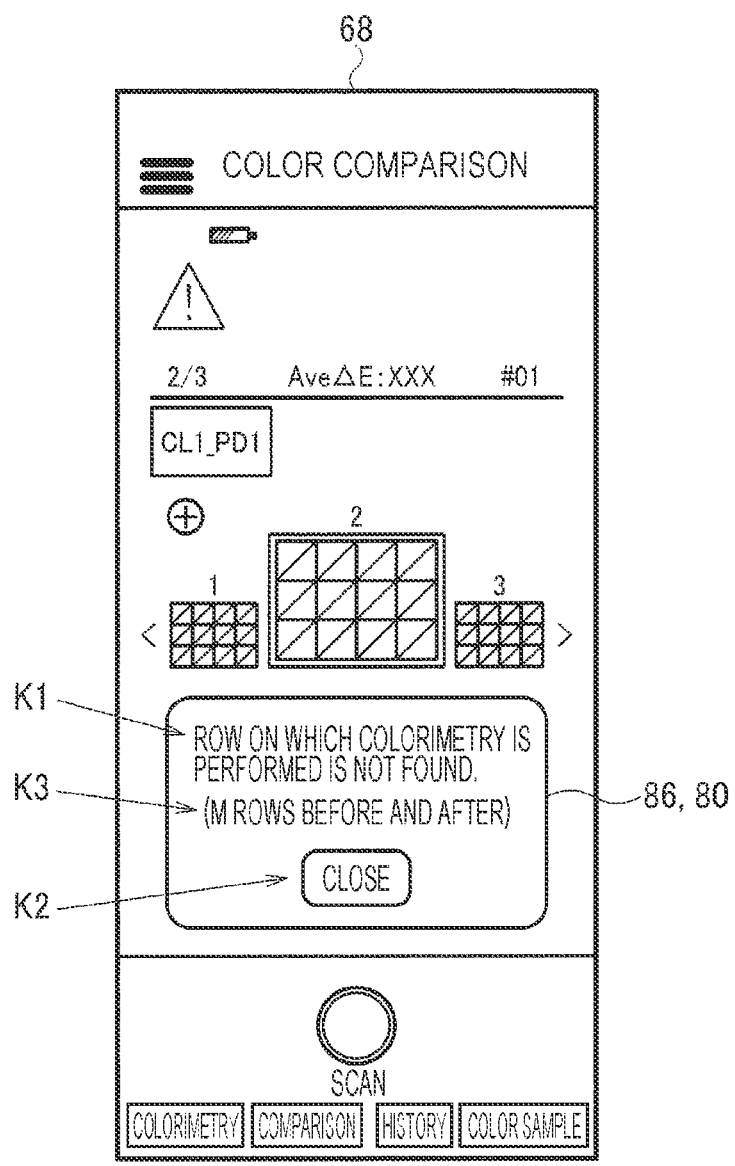
FIG. 23 is another diagram illustrating an example of a screenshot to which the techniques of the present embodiment are applied.

In the examples illustrated in FIGS. 17 to 22, since the row of reference colors corresponding to the color chart on which colorimetry has been accidentally performed by the user is within the range of M rows before and after the row expected for colorimetry, it may be considered that although Yes is determined in step S440, No is determined in step S440. When the determination in step S440 is No, for example, as illustrated in FIG. 23, the display processing unit 20 displays the error message screen 86, which is one of the message screens 80. On the error message screen 86 in FIG. 23, for example, a message, indicated by K1, indicating that the row on which colorimetry is performed is not found is displayed. In addition, the display processing unit 20 displays a "Close" icon, indicated by K2, on the error message screen 86, which differs in this point from the first message screen 82 and the second message screen 84. This is because it is sufficient if the screen allows the user to recognize the occurrence of an error. In such a manner, in the colorimetry system 10 according to the present embodiment, the display processing unit 20 displays a colorimetry error when the comparison processing unit 19 determines that the color difference average value between the colors of a row on which colorimetry is performed and the colors of each of M rows before and after the row is greater than or equal to a certain value. Such a manner enables the user to recognize that colorimetry has been performed on a row that is apart from the M rows before and after the row including the color chart or the like corresponding to the row expected for colorimetry. The display processing unit 20 may display, as indicated by K3, that the reference colors in the M rows before and after the row expected for colorimetry are compared with the row including the color chart or the like on which colorimetry is performed. Thereby, the colorimetry system 10 may present more detailed error information to the user.

As described above, a colorimetry system according to the present embodiment includes a comparison processing unit that performs a comparison process for the color values of colors obtained by colorimetry performed by a colorimetry unit, which is in charge of colorimetry, and a display processing unit that performs a process of displaying a comparison processing result obtained by the comparison processing unit. The comparison processing unit determines whether the colors of a row on which colorimetry is performed correspond to the colors of the row expected for colorimetry and, if the colors of the row on which colorimetry is performed correspond to the colors of the row expected for colorimetry, performs a process of storing data on the colors of the row on which colorimetry is performed. If the colors of the row on which colorimetry is performed do not correspond to the colors of the row expected for colorimetry, the display processing unit performs a display process of asking the user whether to store data on the colors obtained by colorimetry.

Such a manner enables the user to verify whether to store a colorimetric data determined to be not correspond to a row expected for colorimetry. Thereby, for example, when the user stores a line on which colorimetry has been performed, colorimetry is not to be performed again. This may reduce the burden of colorimetry operations imposed on the user.

In addition, to determine whether the colors of a row on which colorimetry is performed correspond to the colors of the row expected for colorimetry, the comparison processing unit may make a determination based on a color difference average value between the colors of the row on which colorimetry is performed and the colors of the row expected for colorimetry.

Such a manner enables the criteria for the determination of whether a line colorimetry error has occurred to be clarified. Thereby, the user may distinguish a colorimetric result obtained when a row including the color chart or the like on which colorimetry is performed is a correct row, from a colorimetric result obtained when the row including the color chart or the like on which colorimetry is performed is not the correct row.

In addition, when the colors of a row on which colorimetry is performed do not correspond to the colors of a row expected for colorimetry, the comparison processing unit may determine the row for colorimetry that corresponds to the row on which colorimetry is performed.

In such a manner, when it is determined that a row including the color chart or the like on which colorimetry has been performed is not the correct row, the user may determine the row on which the colorimetry has been accidentally performed.

In addition, to determine a row for colorimetry that corresponds to a row on which colorimetry is performed, the comparison processing unit may compare the colors of M rows before and after a row expected for colorimetry with the colors of the row on which colorimetry is performed.

In such a manner, when it is determined that the row including the color chart or the like on which colorimetry has been performed is not the correct row, the row on which the colorimetry has been accidentally performed may be searched for by using the row including the color chart or the like corresponding to the row expected for colorimetry.

In addition, the display processing unit may display a colorimetry error when the comparison processing unit determines that the color difference average value between the colors of a row on which colorimetry is performed and the colors of each of M rows before and after the row is greater than or equal to a certain value.

Such a manner enables the user to recognize that colorimetry has been performed on a row that is apart from the M rows before and after the row including the color chart or the like corresponding to the row expected for colorimetry.

In addition, when the comparison processing unit determines that the colors of the row on which colorimetry is performed do not correspond to the colors of the row expected for colorimetry and that a row for colorimetry corresponding to the row on which colorimetry is performed is present, the display processing unit performs a display process of asking the user whether to newly store data on the colors of the row on which colorimetry is performed.

Such a manner enables the user to verify whether to newly store a colorimetric result of a row including the color chart or the like on which colorimetry has been accidentally performed.

In addition, when the comparison processing unit determines that the colors of the row on which colorimetry is performed do not correspond to the colors of the row expected for colorimetry and that the row on which colorimetry is performed is a row on which colorimetry is already complete, the display processing unit may perform a display process of displaying a message asking the user whether to store data on the colors of the row on which colorimetry is performed.

Such a manner enables the user to verify whether to store a colorimetric result of the color chart or the like on which colorimetry has been accidentally performed and on which colorimetry is already complete, by overwriting the existing colorimetric result.

In addition, when data on the colors of a row on which colorimetry is performed is stored, the display processing unit may set a row regarding the stored data on the colors as a row on which colorimetry is already complete, and perform a display process of displaying, as a row expected for colorimetry, a row on which colorimetry is not yet performed.

Such a way enables the user to easily ascertain a row including the color chart on which colorimetry is not yet performed in line colorimetry.

In addition, a terminal device according to the present embodiment includes a terminal comparison processing unit that performs a comparison process for the color values of colors obtained by colorimetry performed by a colorimeter, which is in charge of colorimetry, and a terminal display processing unit that performs a process of displaying a comparison processing result obtained by the terminal comparison processing unit. The terminal comparison processing unit determines whether the colors of a row on which colorimetry is performed correspond to the colors of a row expected for colorimetry and, if the colors of the row on which colorimetry is performed correspond to the colors of the row expected for colorimetry, performs a process of storing data on the colors of the row on which colorimetry is performed. If the colors of the row on which colorimetry is performed do not correspond to the colors of the row expected for colorimetry, the terminal display processing unit performs a display process of asking the user whether to store data on the colors obtained by colorimetry.

In addition, a processing method according to the present embodiment performs a comparison process of performing comparison for the color values of colors obtained by colorimetry performed by a colorimetry unit, which is in charge of colorimetry, a display process of displaying a comparison processing result obtained through the comparison process, and a process of determining whether the colors of a row on which colorimetry is performed correspond to the colors of a row expected for colorimetry. Furthermore, if the colors of the row on which colorimetry is performed correspond to the colors of the row expected for colorimetry, the processing method according to the present embodiment performs a process of storing data on the colors of the row on which colorimetry is performed, and, if not, performs a display process of asking the user whether to store data on the colors obtained by colorimetry.

In addition, a program according to the present embodiment causes a computer to function as the comparison processing unit that performs a comparison process for the color values of colors obtained by colorimetry performed by the colorimetry unit, which is in charge of colorimetry, and the display processing unit that performs a process of displaying a comparison processing result obtained by the comparison processing unit. Additionally, the comparison processing unit determines whether the colors of the row on which colorimetry is performed correspond to the colors of a row expected for colorimetry and, if the colors of the row on which colorimetry is performed correspond to the colors of the row expected for colorimetry, performs a process of storing data on the colors of the row on which colorimetry is performed. Additionally, if the colors of the row on which colorimetry is performed do not correspond to the colors of the row expected for colorimetry, the display processing unit performs a display process of asking the user whether to store data on the colors obtained by colorimetry.

Although the present embodiment has been described above in details, the person skilled in the art would readily understand that many modifications may be made without substantially departing from new matters and effects of the present embodiment. Accordingly, all of such modifications are considered to fall within the scope of the present disclosure. For example, in the specification or the figures, the terms used at least once together with different broader or synonymous terms may be replaced with the different terms in any part of the specification or the figures. In addition, all combinations of the present embodiment and modifications are included in the scope of present disclosure. In addition, the configurations and operations of the colorimetry system, the terminal device, the processing method, the program, and so on are not limited to those described in the present embodiment, and various modifications may be carried out. For example, the colorimetry is not limited to colorimetry on a color chart with a plurality of rows having a plurality of colors but may also include colorimetry on one portion on paper or cloth and colorimetry on a plurality of discrete portions. That is, the rows may have only one color and may not be aligned. In addition, a device that performs colorimetry and a device that acquires a colorimetric result from the device, which performs colorimetry, and performs comparison may be separate devices, and, instead of the display processing unit performing display, another display device may perform display or sound notification may be provided.

What is claimed is:

1. A colorimetry system comprising:
   a colorimeter configured to perform colorimetry; and
   a processor configured to:
   determine whether a color of a row obtained by current colorimetry performed by the colorimeter matches a color of a row expected to be obtained by colorimetry,
   when a match is determined, perform a process of storing data on the obtained color of the row, and
   when no match is determined, perform a process to determine which rows have had colorimetry currently performed on them, and when it is determined that the row that has colorimetry currently performed is a same row on which colorimetry is already completed by past colorimetry, ask a user whether to store the data on the color of the row on which colorimetry is currently performed, by overwriting existing data made by past colorimetry.

2. The colorimetry system according to claim 1, wherein the processor is configured to:
   based on a color difference average value between colors of a row on which colorimetry is performed and colors of an expected row for colorimetry, determine whether the color obtained by colorimetry matches the color expected to be obtained by colorimetry.

3. The colorimetry system according to claim 2, wherein the processor is configured to:
   as the process of determining which rows have had colorimetry performed on them, compare colors of M rows before and after a row expected for colorimetry with colors of a row on which colorimetry is performed.

4. The colorimetry system according to claim 3, wherein the processor is configured to:

when the processor determines that a color difference average value between the colors of the row on which colorimetry is performed and colors of each of the M rows is greater than or equal to a predetermined value, perform a display process of displaying a colorimetry error.

5. The colorimetry system according to claim 1, wherein the processor is configured to:
when data on colors of a row on which colorimetry is performed is stored, set a row regarding the stored data on colors as a row on which colorimetry is already complete, and perform a display process of displaying, as a row expected for colorimetry, a row on which colorimetry is not yet performed.

6. A terminal device comprising:
a communicator configured to communicate with a colorimeter that performs colorimetry and to obtain a colorimetric result; and
a processor, the processor being configured to:
determine whether a color of a row obtained by current colorimetry corresponds to a color of a row expected to be obtained by colorimetry,
when the color of the row obtained by current colorimetry corresponds to the color of the row expected to be obtained by colorimetry, perform a process of storing data on the color of the row obtained by colorimetry, and
when the color of the row obtained by current colorimetry does not correspond to the color of the row expected to be obtained by colorimetry, perform a process to determine which rows have had colorimetry currently performed on them, and when it is determined that the row that has colorimetry currently performed is a same row on which colorimetry is already completed by past colorimetry, ask a user whether to store the data on the color of the row on which colorimetry is currently performed, by overwriting existing data made by past colorimetry.

7. A non-transitory computer-readable recording medium storing a program causing a computer to execute:
determining whether a color of a row obtained by current colorimetry corresponds to a color of a row expected to be obtained by colorimetry;
when the color of the row obtained by current colorimetry corresponds to the color of the row expected to be obtained by colorimetry, performing a process of storing data on the color of the row obtained by colorimetry; and
when the color of the row obtained by current colorimetry does not correspond to the color of the row expected to be obtained by colorimetry, perform a process to determine which rows have had colorimetry currently performed on them, and when it is determined that the row that has colorimetry currently performed is a same row on which colorimetry is already completed by past colorimetry, asking a user whether to store the data on the color of the row on which colorimetry is currently performed, by overwriting existing data made by past colorimetry.

8. A colorimetry system comprising:
a colorimeter configured to perform colorimetry against a color of a plurality of rows; and
a processor configured to:
perform a process to determine whether a row that currently has colorimetry performed on it is a match with a row on which colorimetry has already been completed by past colorimetry, and
when a match is determined, ask a user whether to store the data on the color of the row on which colorimetry is currently performed, by overwriting existing data made by past colorimetry.

* * * * *